United States Patent [19]

Adams et al.

[11] Patent Number: 4,992,187

[45] Date of Patent: Feb. 12, 1991

[54] COMPOSITION FOR CLEANING AN INTERNAL COMBUSTION ENGINE

[75] Inventors: Lawrence J. Adams, Ponte Vedra Beach; Thomas R. Fruda, St. Augustine; Paul P. Hughett, Jacksonville, all of Fla.

[73] Assignee: Petro Chemical Products, Inc., Jacksonville, Fla.

[21] Appl. No.: 436,662

[22] Filed: Nov. 15, 1989

[51] Int. Cl.$^5$ ................ C10M 133/44; C10M 133/26
[52] U.S. Cl. ..................................... 252/50; 244/340; 244/458
[58] Field of Search ................ 44/62, 64, 63, 53, 77; 252/50

[56] References Cited

U.S. PATENT DOCUMENTS

| | | | |
|---|---|---|---|
| 4,341,529 | 7/1982 | Burns | 44/63 |
| 4,397,750 | 8/1983 | Chibnik | 44/63 |
| 4,405,334 | 9/1983 | Seemuth | 44/63 |
| 4,877,415 | 10/1989 | Kapuscinski | 44/63 |

Primary Examiner—Jacqueline V. Howard
Attorney, Agent, or Firm—Lieberman Rudolph & Nowak

[57] ABSTRACT

A formulated composition is disclosed which is designed to clean baked-on, carbonized sludges and varnish deposits from the upper cylinder surfaces of automobile, motorcycle and truck engines. The product is comprised of a mutually synergistic solution of selected cyclic compounds, aliphatic amines and water, preferably dissolved in a hydrocarbon or hydrocarbon and aliphatic lower alcohol fuel base, to which minor materials may optionally be added. The solution or base product may be placed in a pressure resistant (aerosol) container pressurized with a compressed gas, such as nitrogen gas. A preferred embodiment of the invention utilizes a synergistic solution of N-methyl-2-pyrrolidone, n.butylamine and de-ionized water, with these ingredients present at certain ratios. This solution is dissolved in either mixed iso-($C_7$, $C_8$)-hydrocarbons or a combination of such hydrocarbons with a minor amount of isopropanol, to which up to about 10% by weight of other optional ingredients may be added. The container may then be sealed with a suitable valve and pressurized. The provided compositions are adequately compatible with the fluorosilicones gasket compositions. By limiting the concentration of the N-Methyl-2-pyrrolidone to 10% of the total, and by changing the n.butylamine (or similar simple primary or secondary amines) to not more than 10% of a tertiary amine, such as triethylamine, outstanding cleaning ability is obtained. When formulae of the subject invention are injected into an engine over a period of several minutes, very significant removal of any deposited contaminants occurs, resulting in smooth and efficient operation and much lower levels of unburned hydrocarbon fuel, carbon monoxide, and other recognized air pollutants. The advantages conferred by a single application of the subject composition are sustained for many thousands of miles of automobile operation.

14 Claims, 12 Drawing Sheets

COMPOSITION FOR CLEANING AN INTERNAL COMBUSTION ENGINE

BACKGROUND OF THE INVENTION

It is known that new, clean automotive engines operate more efficiently than older ones that have accrued deposits of carbonized soil in the cylinder areas. They also produce less pollutant gases in the form of tailpipe emissions.

The functional problems of older engines have resulted in the use of more highly refined gasoline/alcohol mixtures, detergent gasolines, computerized fuel injection systems, and in the marketing of engine injector solutions designed to solubilize the offending deposits. The pollution problem has been partly resolved by the use of costly catalytic converter equipment in a few countries. Worsening smog conditions and related air pollution problems in metropolitan areas attest to the fact that these approaches are relatively ineffective.

For many years there has been a search for engine additives that, when injected directly into the upper cylinder areas, would exert a profound cleaning effect and thus serve to remove carbonized varnishes and sludge deposits that form on spark plugs, fuel orifices and cylinder walls. These deposits inhibit the optimum burning of fuel. As such, they reduce mile-per-gallon efficiency. Additionally, they tend to partly plug critical orifices, interfere with spark gap operation of spark plugs, cause piston sticking, and strongly promote the generation of partially burned pyrolysis products during combustion of gasolines and diesel fuels. Some fuel remains unburned. All these products are discharged into the exhaust system. They include unburned hydrocarbons (aliphatics, cyclics and aromatics), polycyclic alcohols, aldehydes and acids (sometimes carcinogenic), oxygenated hydrocarbons of other types, and poisonous carbon monoxide gas. These effluents are, to various degrees, further oxidized by the catalytic converter. But significant amounts escape from the tailpipe and those pose serious environmental hazards to humans, animals and crops. All are included in the Federal Clean Air Act, as amended, for this reason. Environmental Protection Agency regulations under the act have imposed severe limitations on the airborne concentrations of these vapors and particulates which, at this time, at least seventy counties and air management districts cannot comply with unless they would be willing to invite an intolerable degree of economic distress.

Most of the discharged tailpipe vapors are capable of chemically reacting with airborne nitrogen (II) oxide in ways that indirectly cause the formation of excessive levels of tropospheric or ground-level ozone. This gas is a strong irritant and possible proto-carcinogen that is directly implicated in smog formation. The Clean Air Act regulations limit ozone concentrations to 0.12 ppm and carbon monoxide levels to 9.0 ppm in air.

Test methods for determining product efficacy have been developed. They have been used to obtain data on the relative cleaning efficiency of individual chemicals, combinations of two or three chemicals that may show synergistic activity, or on completely formulated concentrates. A well regarded screening method uses the following procedure:

a. Carefully remove a spark plug from an engine.
b. Using an air knife, blow away any loose contamination. (Optional)
c. Weigh the spark plug.
d. Immerse it in the test liquid for five minutes at 77° F. (25° C.).
e. Rinse momentarily in a volatile solvent, such as 1,1,1,-trichloromethane.
f. After or during drying, repeat the air knife removal of loose contamination. (Optional)
g. Reweigh and note weight loss due to contaminant removal.
h. Visually compare with original spark plug condition, to establish approximate per cent of contaminant removal.
i. Using a mild abrasive suspension/dispersion, a bronze buffing wheel or other suitable process, remove any remaining contaminant without removing any of the steel spark plug substance.
j. Determine weight loss due to 100% contaminant removal.
K. Calculate percent removal due to immersion in the test liquid and compare with visual result of step h.

Various modifications of this procedure have been used to determine the efficiency of over a hundred substances and blends, during product development.

In this test it will be appreciated that no two spark plugs will give identical results, even if they were used side by side for the same service life in a given engine. Some deposits will be heavier, others will be more intensely burned on, and some will exhibit higher degrees of pyrolytic carbonization. This has made it necessary to differentiate between spark plugs when testing by what is termed "the Cold Spark Plug Immersion Test" (CSPIT). Three categories have been established:

a. Heavy baked-on varnish/sludge deposits.
b. Light, baked-on varnish/sludge deposits.
c. Highly carbonized, baked-on varnish/sludge deposits.

In the case of well-synergised, highly effective formulas of the subject invention, CSPIT removal has been 90–100% for the light, baked-on varnish/sludge deposits and 50–60% for the other two categories.

A large number of tests have been made on automotive engines. They have been used to determine such attributes as:

a. Dynamic firing voltages (kV).
b. Specific exhaust gas concentrations (upstream from the catalytic converter) including: i. Unburned hydrocarbon vapors (ppm). ii. Carbon monoxide gas (ppm). iii. Oxygen gas (ppm). iv. Carbon dioxide gas (ppm).
c. Minimum smooth idling speed (rpm).
d. Increase in idling speed due to treatment (rpm).
e. Engine smoothness at idling speed due to treatment. (Substantive)
f. Degree of spark plug cleaning—by observation.
g. Reliability of the CSPIT, as a predictive test method. Typical tests results are provided in the next section. They show that the CSPIT method is a reliable predictive assay, removing about 90 percent as much spark plug contaminants as are removed in the same time period by what is termed "The Hot Engine Cleaning Test" (HECT).

A well regarded procedure for conducting the HECT assay is recited as follows:

a. Select a car whose engine has been driven many thousands of miles on the same set of spark plugs.
b. Remove one or more spark plugs and examine for amount and type of varnish/sludge, after blowing off excess with an air knife.

c. Replace, using same spark plugs, or different test plugs.
d. Snap accelerate the engine to about 2000 rpm and run for two minutes on gasoline.
e. Snap accelerate the engine to about 5000 rpm and run for a few seconds to purge any loose carbonaceous matter out of the cylinders.
f. Conduct control tests.
   Measure dynamic firing voltage (kV) on all cylinders, at idling rpm.
   Measure tailpipe emissions at idling rpm.
   Measure kV at low-cruise (1500 rpm).
   Measure kV at high-cruise (2500 rpm).
   Measure tailpipe emissions at high-cruise (2500 rpm).
g. Conduct product tests.
   Connect product dispenser to engine.
   Run engine at 2400-2500 rpm and add product. (Typically, add 260 grams of product in five minutes).
   Repeat steps d. and e.
   Repeat tests listed under f.
h. Remove the one or more test spark plugs and determine percent sludge removal.

Repeating the CSPIT procedure on cleaned spark plugs results in very little additional contaminant removal; e.g. 5-15% more.

The cleaning ability and emissions reduction properties of the subject composition have been evaluated in comparison with those of several of the ten or twelve other cleaners currently on the market. It is significantly better. Although these products make label claims promising to improve engine performance and prolong the service life of catalytic converters by reducing harmful emissions, in fact they demonstrate very limited benefits. Consequently, the present market is small and rather static. Advertising for the compounds is almost non-existent, and some firms include them only to round out a line of automotive products.

Accordingly, the subject invention offers great advantages over the products currently being marketed, and offers the first effective engine cleaning composition compatible with fluorosilicone automotive gaskets.

SUMMARY OF THE INVENTION

The subject invention provides a composition of matter for dissolving varnish and burned-on sludge in an internal combustion engine which comprises (i) a ring-containing compound wherein the ring is composed of five or six atoms consecutively linked, and (ii) hydrazine or an aliphatic amine. The subject invention also provides a pressurized container which comprises an amount of this composition and a gas propellant, as well as a method for using the same.

DETAILED DESCRIPTION OF THE INVENTION

Figure 1:
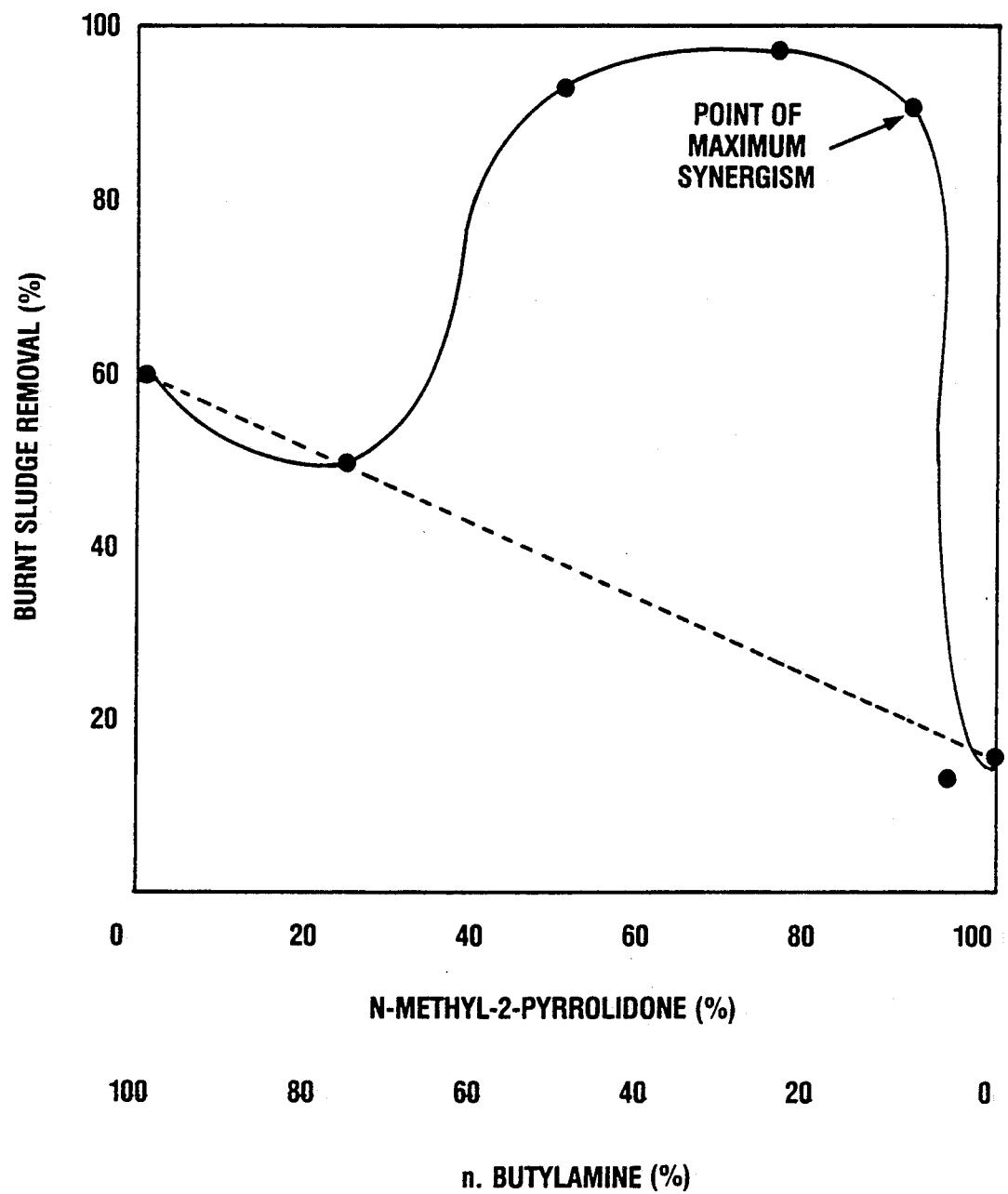
FIG. 1—Is a graph showing the cleaning efficiency of N-methyl-2-pyrrolidone and n.butylamine blends on spark plug sludge in a five (5) minute test. The dashed line represents the theoretical (expected) curve. The solid line represents the actual (synergistic) curve.

The subject invention provides a composition of matter for dissolving varnish and burned-on sludge in an internal combustion engine which comprises (i) a ring-containing compound wherein the ring is composed of five or six atoms consecutively linked, and (ii) hydrazine or an aliphatic amine.

The atoms in the ring may be carbon, nitrogen, oxygen, or sulfur, and the compound may comprise straight or branched chains attached to one or more of the atoms.

A large number of pure solvents have been tested by the CSPIT procedure. Many are classified as extremely strong solvents by such tests as Kauri-Butanol, Solubility Product, and so forth. With the exception of three aliphatic amines and hydrazine, none of the solvents showed any significant sludge removal activity.

Over fifty two component blends, many of them containing the aliphatic amines, were then tested by the CSPIT method. Surprisingly, many of the aliphatic amine blends were found to exhibit synergistic activity, removing the varnish/sludge deposits on spark plugs with outstanding speed and efficiency. In the case of the synergistic compositions, most of the removal values for specific blends were substantially greater than would have been predicted from a straight line relationship, using the removal values of the individual solvents. For example, a blend of 75% N-methyl-2-pyrrolidone and 25% n.butylamine showed 97 percent removal of light, baked-on varnish/sludge deposits. However, only a 26 percent removal would have been predicted, based upon a weighted average of the removal ratings of the pure components.

When these synergistic pairs were incorporated into finished concentrates, the removal abilities of the concentrates appeared to be a close match to the predictable or theoretical value if no additional synergistic solvents were added. For example, a concentrate containing 25% of a synergistic blend with an 80 percent removal rating might have a removal efficiency of 20 percent if the diluent was a non-synergistic solvent, such as an iso-octane/iso-propanol blend.

During the testing, various simple, aliphatic amines were couple with one of the following compounds:

| Ring Compound | Skeletal Structure |
| --- | --- |
| N-Methyl-2-pyrrolidone (M-Pyrol) | (five-membered ring with N-CH₃ and C=O) |
| Tetrahydrofuran (THF) | (five-membered ring with O) |
| 4-Butyrolactone | (five-membered ring with O and C=O) |
| Toluene | (benzene ring with CH₃) |

All are very strong solvents in normal circumstances. None were particularly effective against burned-on varnishes. Each produced strong synergism with the amines, at 5–15% amine or higher for the heterocyclics, and 20% or higher for the toluene/n.butylamine blend.

The degree of varnish/sludge removal, versus binary composition has been carefully determined for ten pairs of solvents, one of which was a simple primary amine. Synergism was found in seven of the pairs. (Counter-synergism, or negative synergism was also determined for some synergistic binaries—especially at high amine compositions.) Such solvents as ethylene glycol n.butyl ether, methyl t.butyl ether, isomeric iso-octanes, and a well known top cylinder lubricant mixture: Lubrizol #8163 (Lubrizol, Inc.) failed to produce synergistic effects with simple aliphatic amines, except for a slight effect with Lubrizol #8163. This may be due to the presence of 20 percent mixed xylenes in the Lubrizol #8163 composition.

(See the table titled Analysis of Figures in the Experimental Detail Section)

The binary system of N-methyl-2-pyrrolidone and n.butylamine demonstrated the highest varnish/sludge removal efficiency (to 97 percent) of those tested.

The binary system on N-methyl-2-pyrrolidone and iso-propylamine was almost as high (to 85 percent) and was later found to be at least as effective as the N-methyl-2-pyrrolidone and n.butylamine couple when diluted into the finished concentrate. However, isopropylamine is extremely flammable, smokes in air, is in short supply, is very caustic and is highly volatile. These properties suggest against commercial applications.

In a preferred embodiment of the subject invention, the composition of matter for dissolving varnish and burned-on sludge further comprises an amount of water effective to increase the dissolving of varnish and burned-on sludge. Most preferably, the water comprises less than about 1.0% of the composition.

The extraordinary cleaning performance of the N-methyl-2-pyrrolidone and n.butylamine couple remained a mystery until it was discovered that the supply container of n.butylamine contained product that was slightly contaminated with water. Control studies using fresh, high grade n.butylamine gave somewhat lower cleaning results. The tramp water was considered to allow the solvent to pass partially into the ionic form: $CH_3(CH_2)_3—NH_3^+OH^-$ (n.butylammonium hydroxide) and more fruitfully develop the high pH value, caustic qualities that are sought after in water-based oven cleaners, charcoal grill cleaners and similar products.

After this, water was deliberately added to formulae, with the finding that it did indeed improve the cleaning ability of both binary synergistic pairs and finished products.

However, only about one per cent water, at most, could be included in finished products before incompatibility resulted and the concentrate would separate into two liquid phases; one richer in water content than the other. This is mainly due to the extreme insolubility of water and the isomeric iso-octanes.

In order to gain the benefits of adding additional water, the use of a simple co-solvent was tested. Such items as methanol, ethanol, iso-propanol and n.propanol were tested. Iso-propanol was eventually selected because it is non-poisonous, available without denaturants or payment of special taxes and readily available from a multiplicity of suppliers. It was used at 10 percent or so of the final formula and thus served to approximately double the amount of water that could be incorporated into the concentrate without phase separation. It is also thought to aid the combustion process somewhat, as in the case of "gasohol" type blends of predominantly gasolines and ethanol. Out of these various studies it became quickly apparent that water could be considered a vital third component of the synergistic systems already described.

It is also preferred that the composition of matter comprises a suitable engine fuel. In optimally applying the teaching of the invention, a synergistic pair of cyclic and amine compounds is prepared, and to this is added about 50 percent or more of isooctanes or similar engine fuel. About 10 percent of isopropanol or similar simple alcohol is then added. De-ionized water must be added in an amount of about 1 percent as the third member of synergistic varnish/sludge remover triad. This is best done by completing a concentrate batch except for water addition, then removing about 10 percent into a separate vessel. The main batch is then titrated with successive amounts of water until incipient phase separation occurs, as evident by the generation of haziness, which takes several minutes to dissipate on further stirring. At that point the separated 10 percent portion is added back in and the batch is complete. Because it is sensitive to moisture and carbon dioxide in the ambient air, as well as flammable, it should be stored in a sealed tank brief periods until used in the aerosol manufacturing operation.

In another embodiment, in the composition of matter, the ring-containing compound and the hydrazine or aliphatic amine are in synergistic amounts.

Often it is preferred that the aliphatic amine is a primary or a secondary amine, and that the amine comprises from about 5% to about 75% of the composition. More preferably, the amine is a $C_1$-$C_8$ primary amine, or is a secondary amine having $C_1$-$C_8$ branches.

It is also preferred that the amine is selected from the group consisting of n-butylamine, triethylamine, diethylamine, and isopropylamine, and the ring-containing compound is selected from the group consisting of N-methyl-2-pyrrolidone, tetrahydrofuran 4-butyrolactone, toluene, and xylene. Normally, the weight ratio of the ring-containing compound to the aliphatic amine is from 4:96 to 96:4.

The binary synergistic pairs of cyclic and simple amines work fairly well without the need for added water. Some of this activity may be due to small amounts of tramp water normally present in the commercial materials, or incorporated from exposure to air during compounding and testing procedures. Ordinary methods of analysis (as the classical Karl Fischer Method) cannot be used to determine this tramp water, due to interferences from the active cyclics and amines, as a general rule.

On the basis of the more that 230 studies performed to date on pure materials, binary blends and concentrates it has been found that synergism takes place between five and six membered single heterocyclic ring compounds, as well as six membered aromatic ring systems, when these materials are mixed with simple aliphatic primary and secondary amines, of $C_2$, $C_3$ and $C_4$ complexity, at ratios that extend from about 4:96 to about 96:4, depending upon the particular blend. The binary of hydrazine and water also gives excellent results.

Figure 2:
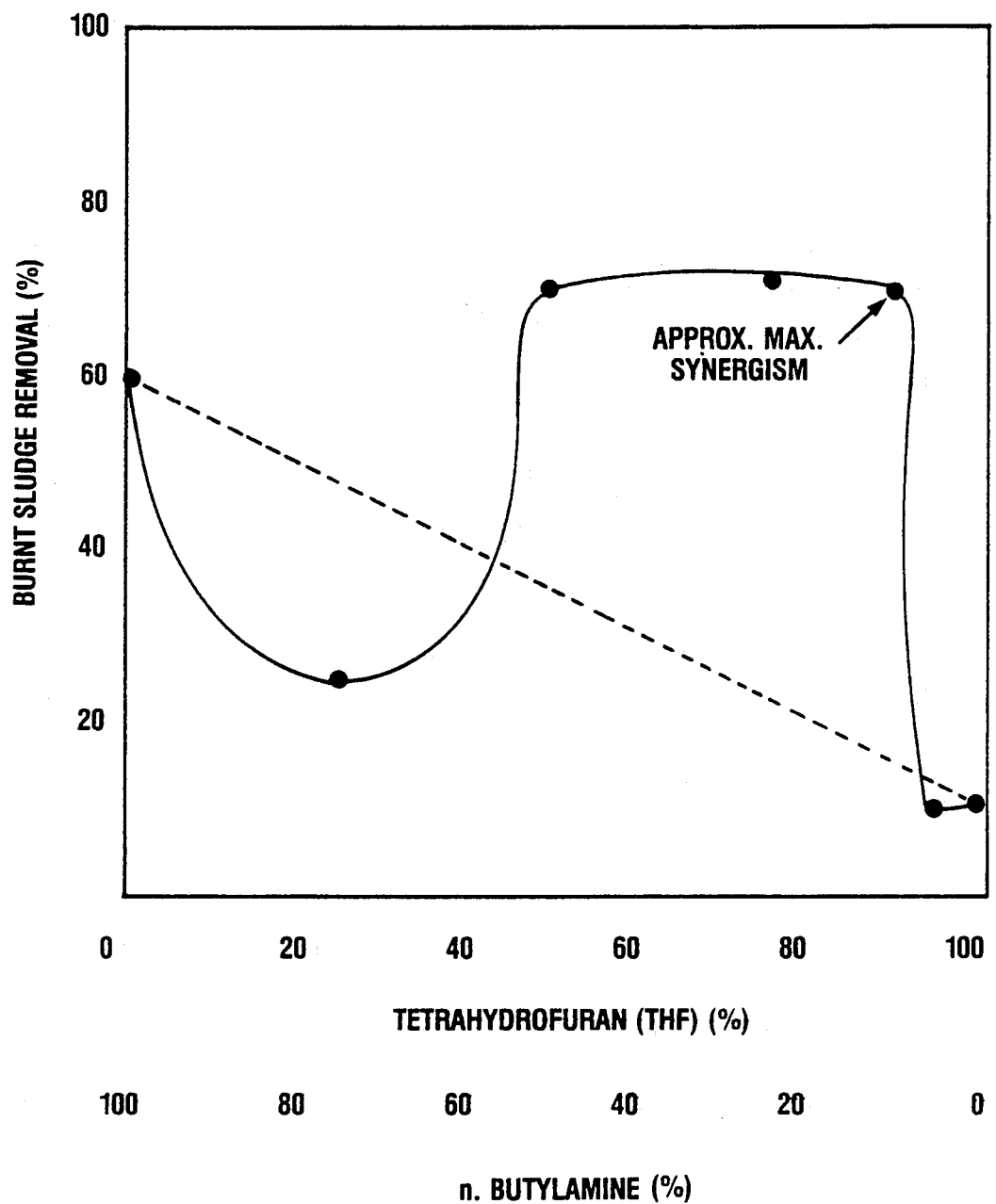
FIG. 2—Is a graph showing the clearing efficiency of tetrahydrofuran and n.butylamine blends on spark plug sludge in a five (5) minute test. The dashed line represents the theoretical (expected) curve. The solid line represents the actual (synergistic) curve.
Figure 3:
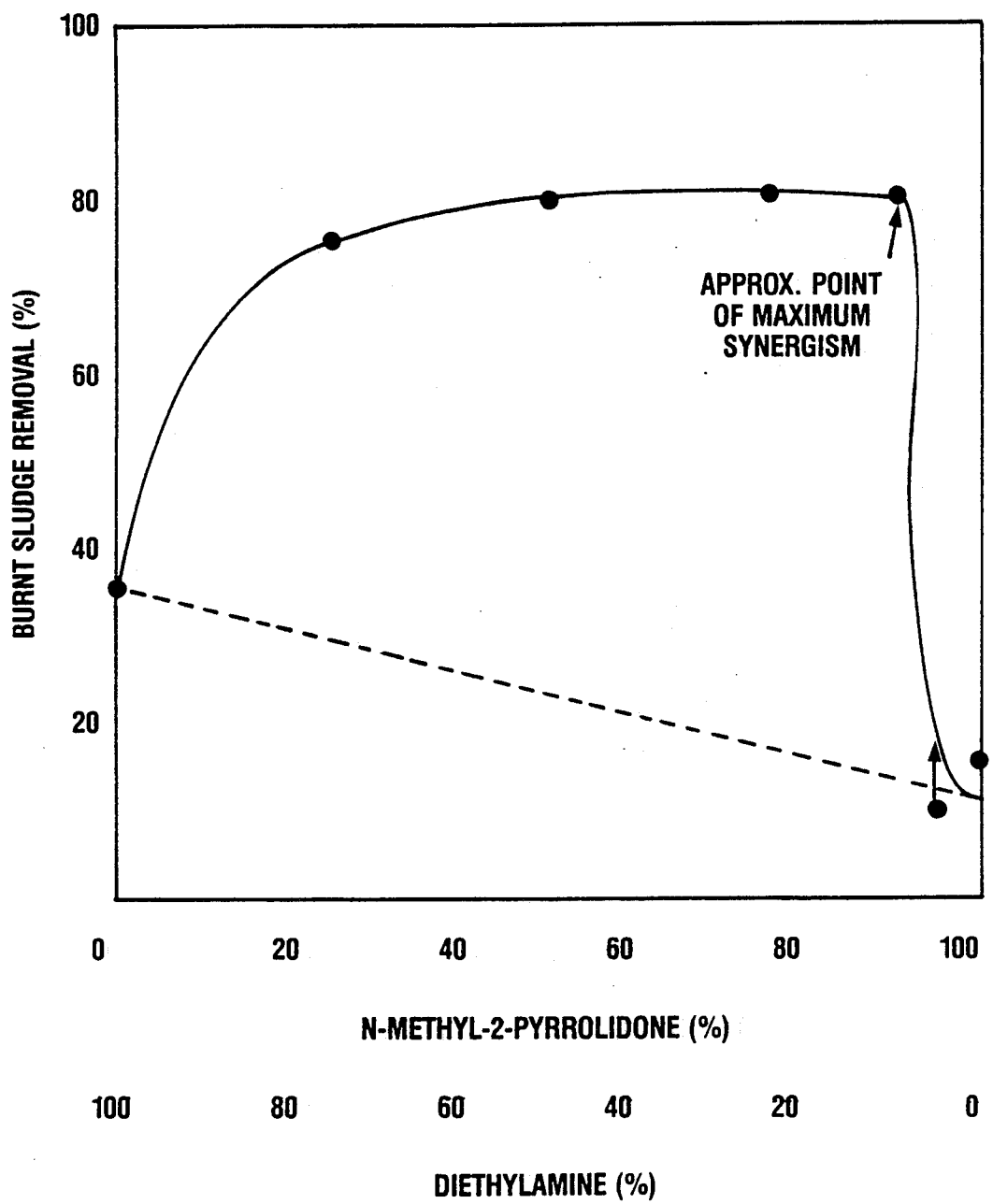
FIG. 3—Is a graph showing the cleaning efficiency of N-methyl-2-pyrrolidone and diethylamine blends on spark plug sludge in a five (5) minute test. The dashed line represents the theoretical (expected) curve. The solid line represents the actual (synergistic) curve.
Figure 4:
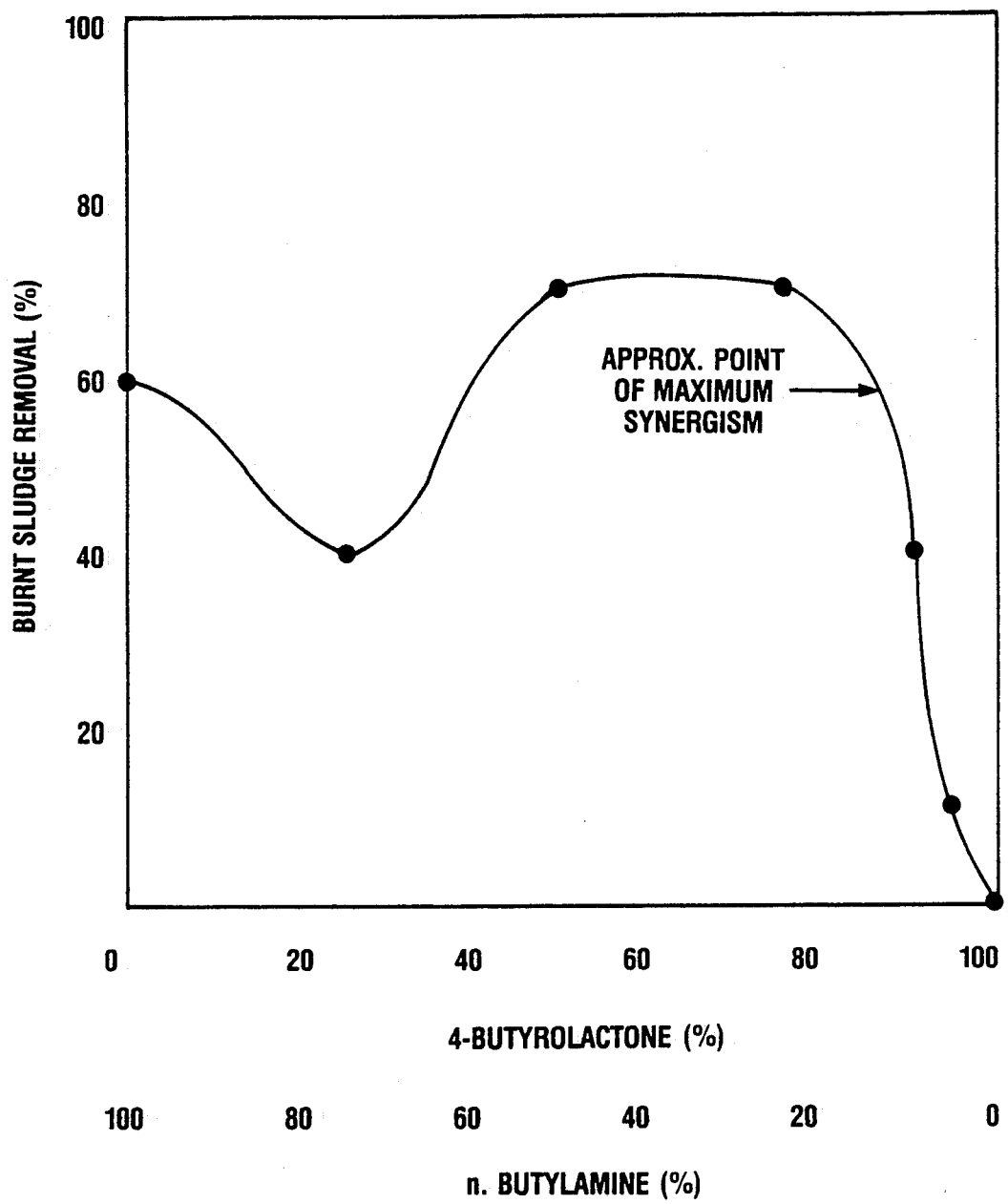
FIG. 4—Is a graph showing the cleaning efficiency of 4-butyrolactone and n.butylamine blends on spark plug sludge in a five (5) minute test. The dashed line represents the theoretical (expected) curve. The solid line represents the actual (synergistic) curve.
Figure 5:
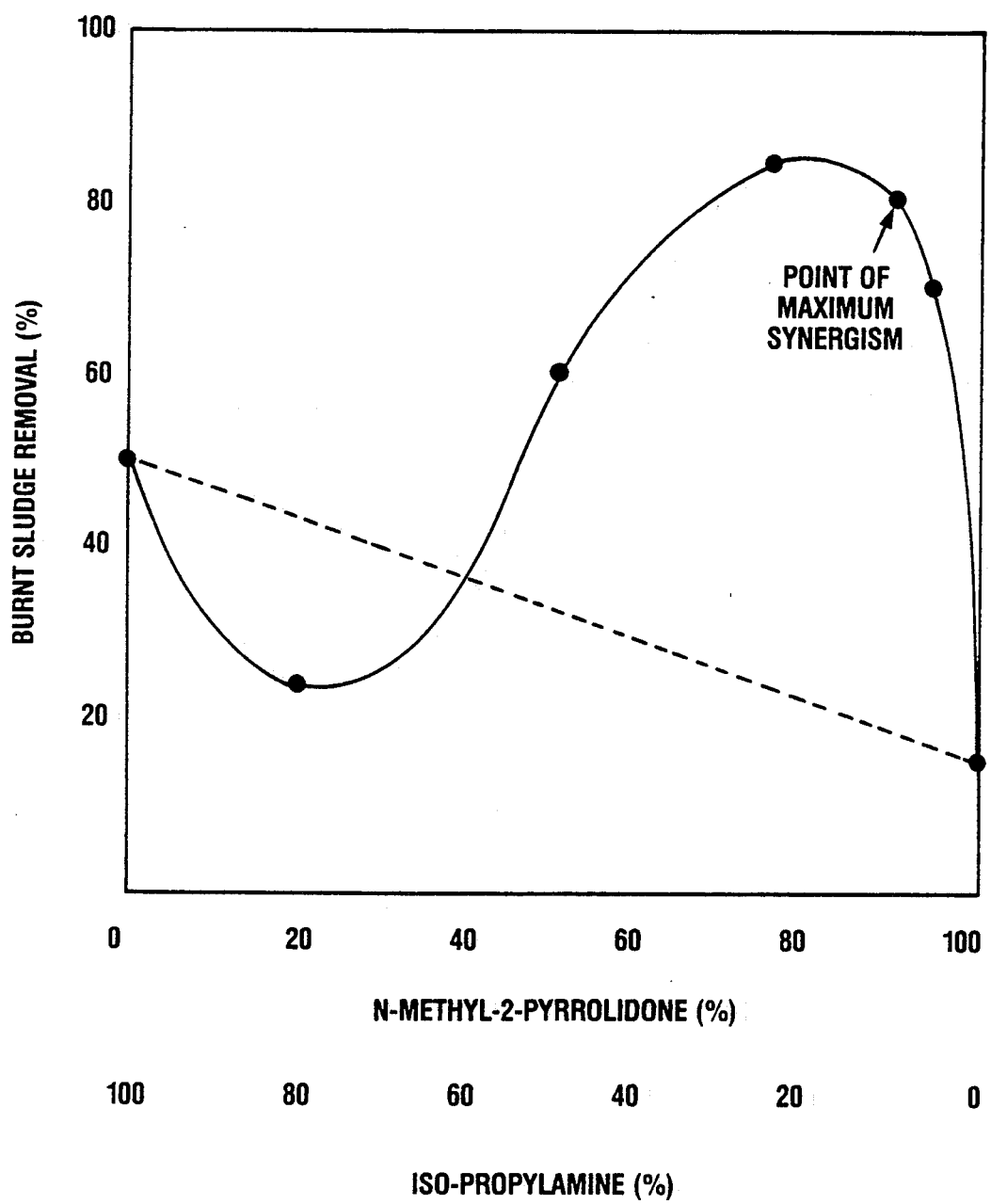
FIG. 5—Is a graph showing the cleaning efficiency of N-methyl-2-pyrrolidone and isopropylamine blends on spark plug sludge in a five (5) minute test. The dashed line represents the theoretical (expected) curve. The solid line represents the actual (synergistic) curve.
Figure 6:
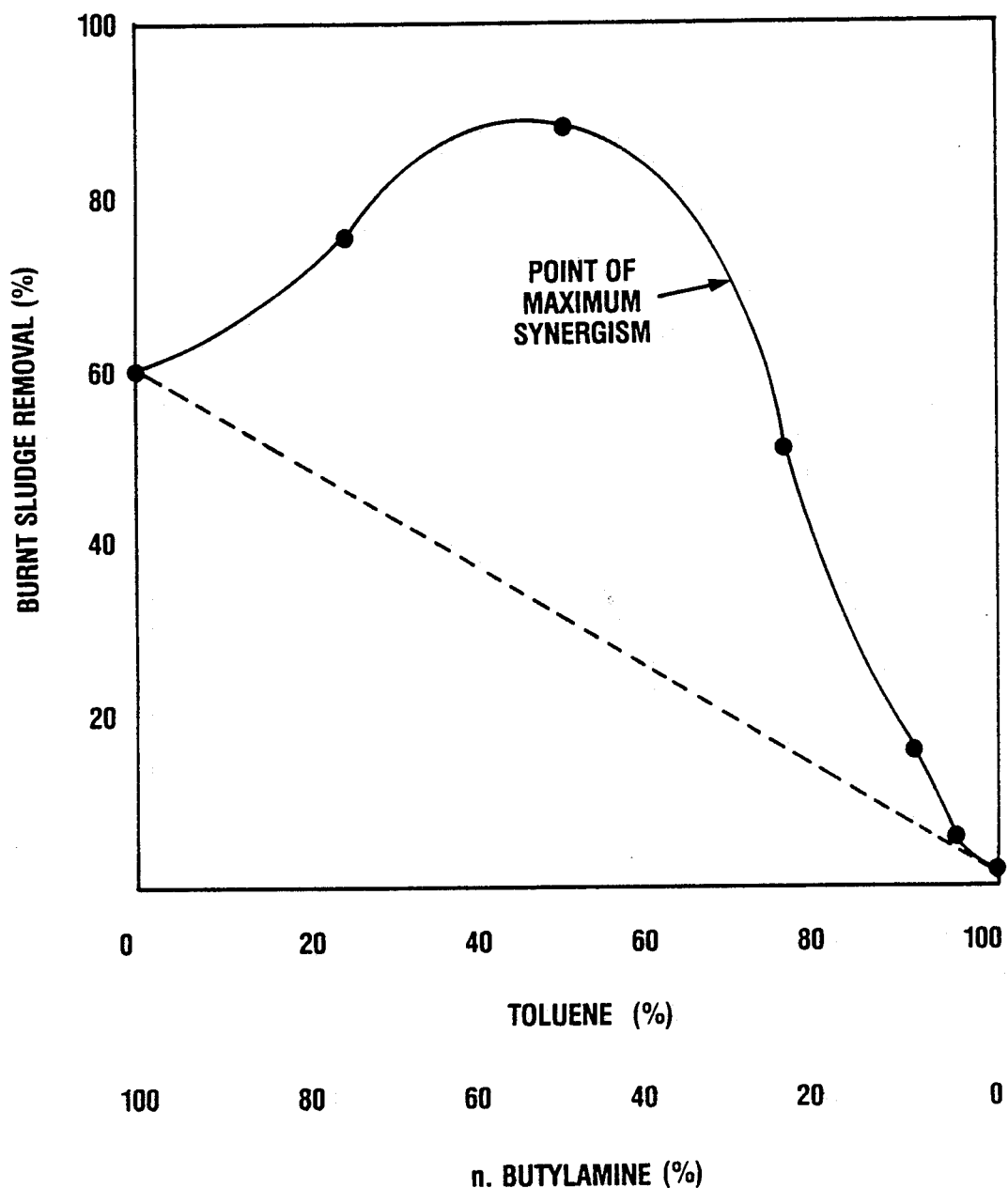
FIG. 6—Is a graph of cleaning efficiency of toluene and n.butylamine blends on spark plug sludge in a five (5) minute test. The dashed line represents the theoretical (expected) curve. The solid line represents the actual (synergistic) curve.
Figure 7:
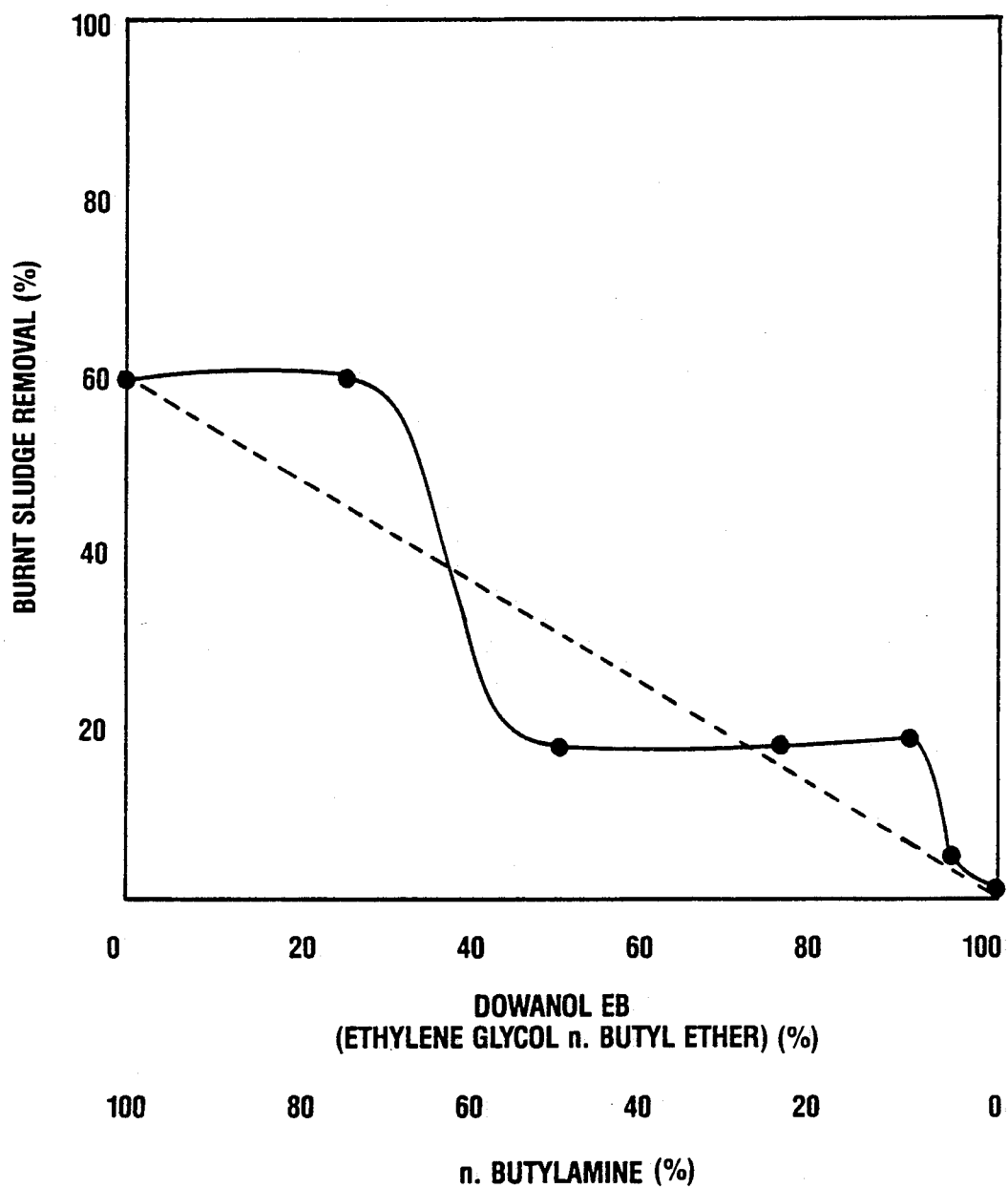
FIG. 7—Is a graph of cleaning efficiency of dowanol EB and n.butylamine blends on spark plug sludge in a five minute test. The dashed line represents the theoretical (expected) curve. The solid line represents the actual (synergistic) curve.
Figure 8:
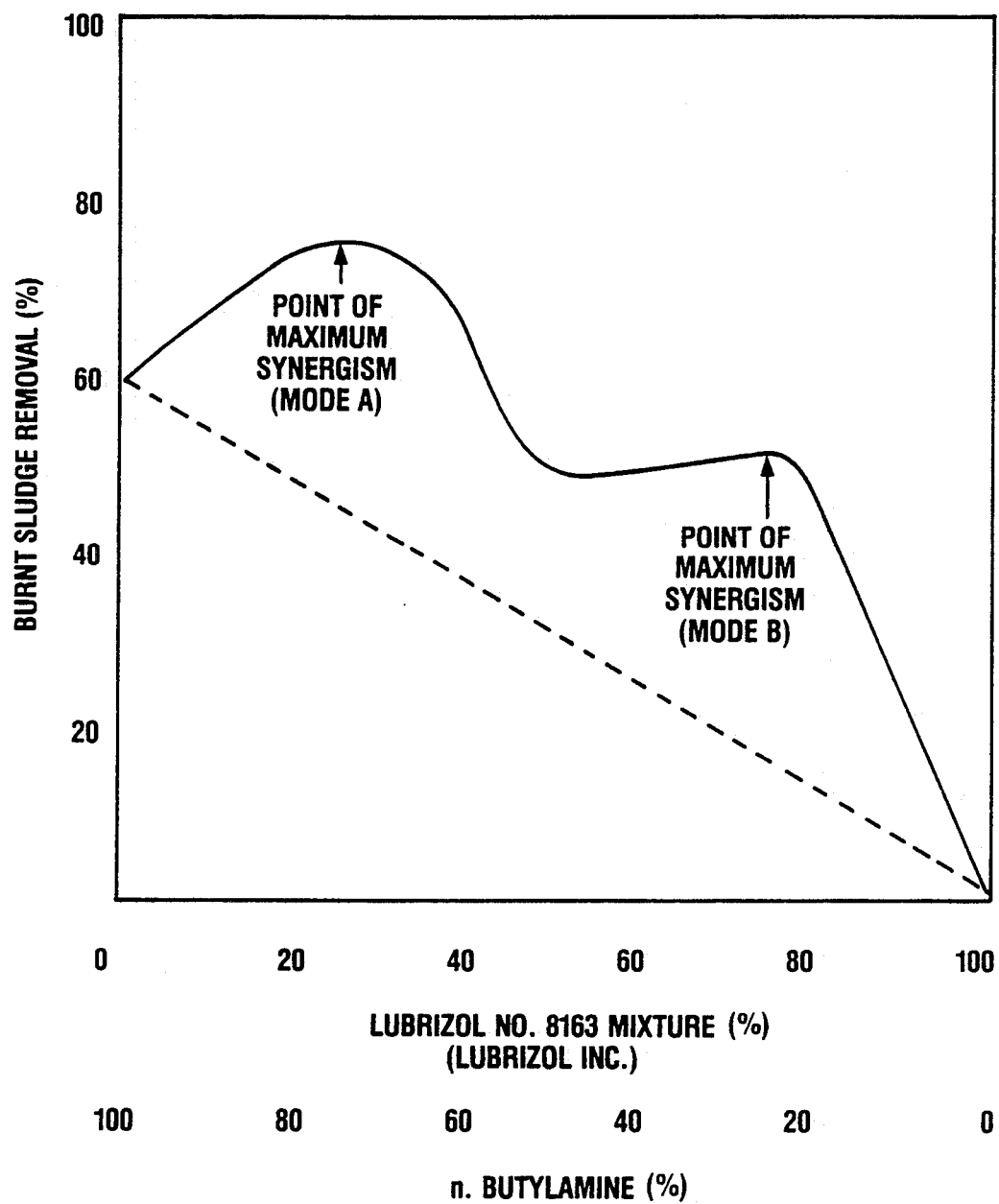
FIG. 8—Is a graph of cleaning efficiency of lubrizol 8163 mixture and n.butylamine blends or spark plug sludge in a five (5) minute test. The dashed line represents the theoretical (expected) curve. The solid line represents the actual (synergistic) curve.
Figure 9:
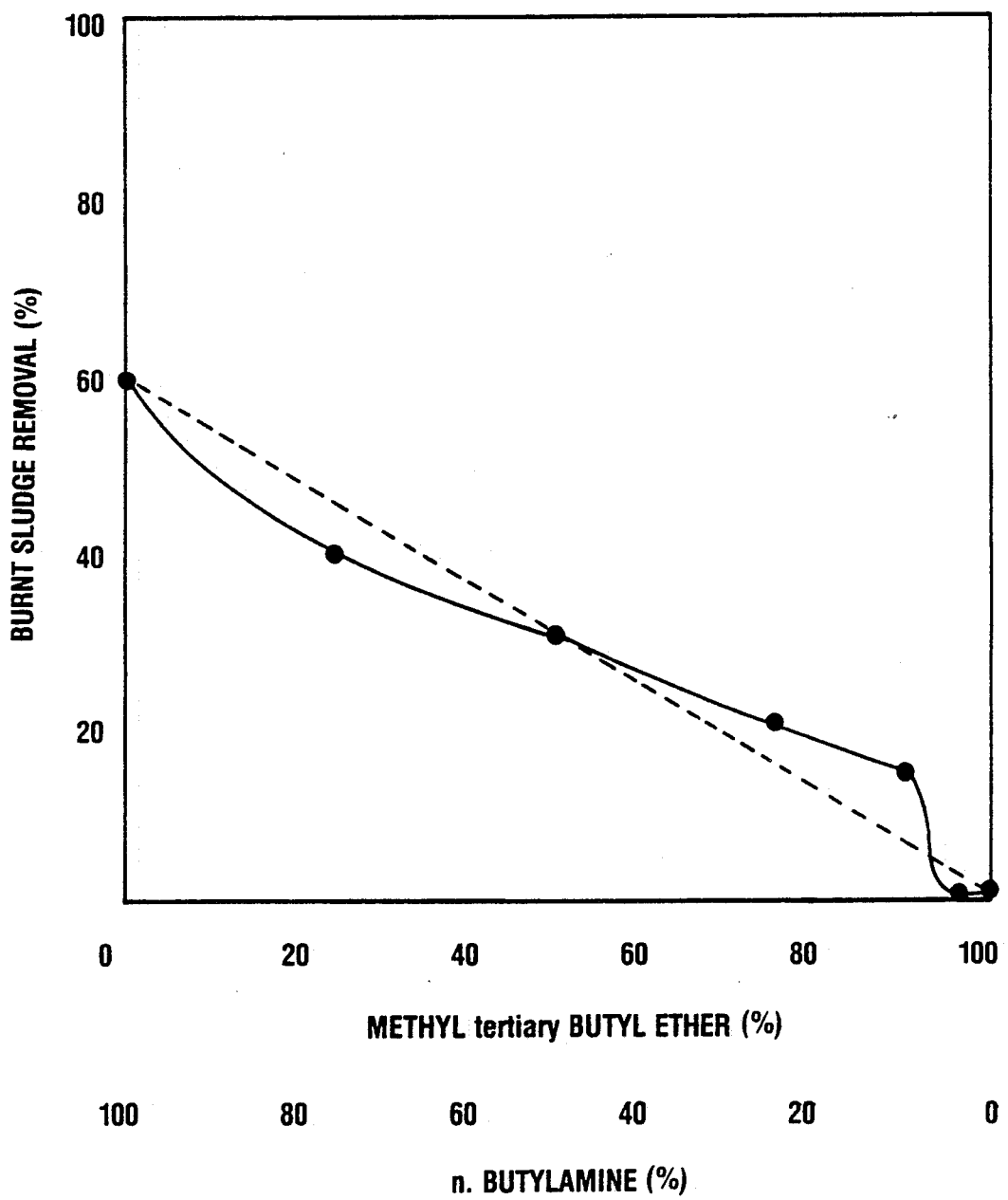
FIG. 9—Is a graph of cleaning efficiency of methyl t.butyl ether and n.butylamine blends on spark plug sludge in a five (5) minute test. The dashed line represents the theoretical (expected) curve. The solid line represents the actual (synergistic) curve.
Figure 10:
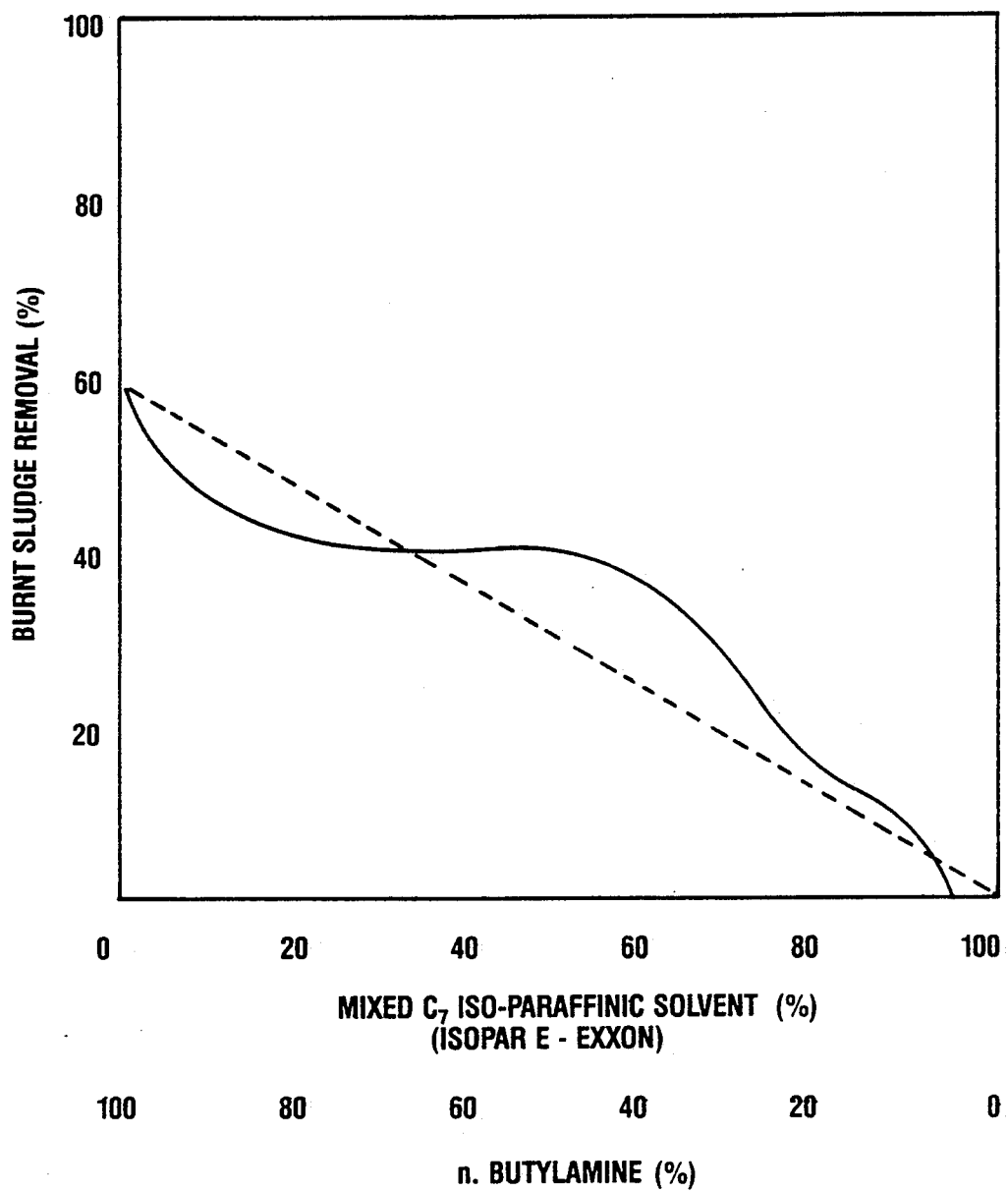
FIG. 10—Is a graph of cleaning efficiency of isopar E (mixed $C_7$ isoparaffins—Exxon) and n.butylamine blend in a five (5) minute test. The dashed line represents the theoretical (expected) curve. The solid line represents the actual (synergistic) curve.
Figure 12:
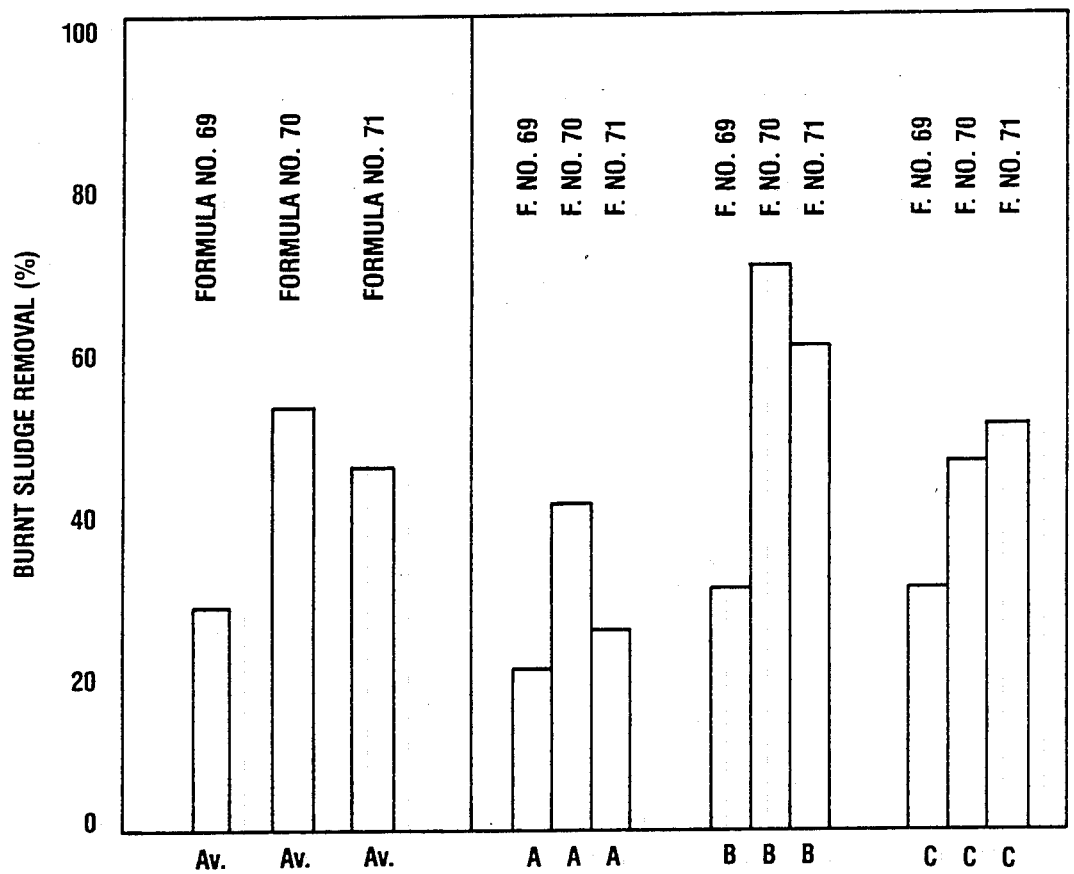
FIG. 12—Is a graph of residue removal at spark plugs after five minutes of treatment with formulae nos. 69, 70, or 71. Formulae nos. 69, 70, and 71 are composites of:
   21% N-methyl-2-pyrrolidone
   5% Amine
   4% Lubrizol No. 8166
   61% Isopar C (mixed $C_7$ isoparaffinics)
   9% Methyl t.butyl ether In formula 69 the amine is n.butylamine; in formula 70 the amine is isopropylamine; and in formula 71 the amine is diethylamine. Type of sludge or deposit:
   A=Heavy crust of burned-on oil sludge
   B=Light crust of burned-on oil sludge
   C=Black, carbonized deposit of sludge
   Av.=Average removal (%) of above sludges.
Figure 11:
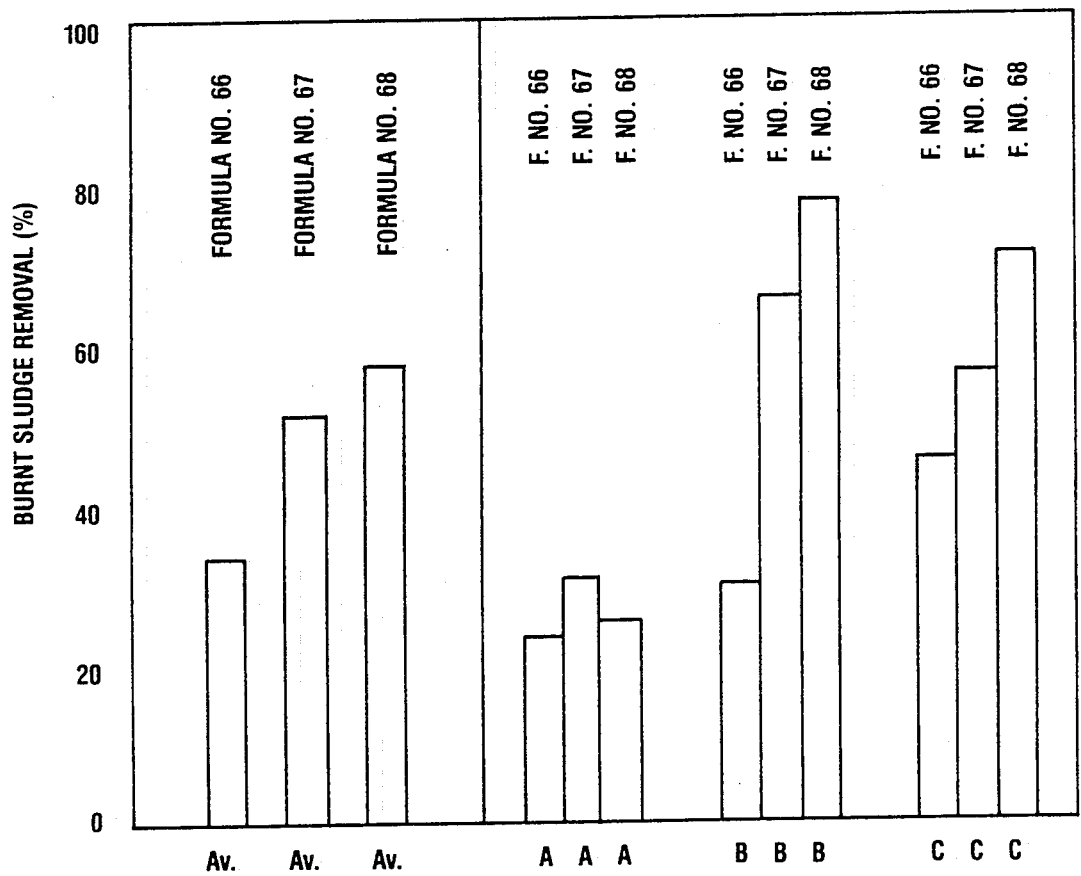
FIG. 11—Is a graph of residue removal at spark plugs after five minutes of treatment with formulae nos. 66, 67, or 68. Formulae nos. 66, 67, and 68 are composites of:
   20% N-methyl-2-pyrrolidone
   10% Amine
   61% Mixed $C_7$ isoparaffinics
   9% Methyl t.butyl ether In formula 66 the amine is n.butylamine; in formula 67 the amine is isopropylamine; and in formula 63 the amine is diethylamine. Type of sludge or deposit:
   A=Heavy crust of burned-on oil sludge
   B=Light crust of burned-on oil sludge
   C=Black, carbonized deposit of sludge
   Av.=Average removal (%) of above sludges.

The synergistic effect of the N-methyl-2-pyrrolidone/n.butylamine couple and the N-methyl-2-pyrrolidone/diethylamine couple is presented in FIGS. 1 and 2.

It will be apparent that a wider array of synergistic binaries could be developed on the basis of further testing. Adding alkyl groups to the ring compounds, or to the simple amines should merely introduce a "moiety diluent" effect. For example, N-n.butyl-2-pyrrolidone and n.octylamine would be expected to exhibit synergism, but to a lesser degree than that of the simpler counterparts. The beneficial effect of using iso-propylamine instead of n.butylamine is shown by the comparison of varnish/sludge removal of Formulae 72 and 73.

|  | FORMULA 72 | FORMULA 73 |
|---|---|---|
| INGREDIENTS* | | |
| N-Methyl-2-pyrrolidone | 20% | 20% |
| n.Butylamine | 4% | — |
| iso-Propylamine | — | 4% |
| Lubrizol 8166 Mixture (Lubrizol, Inc.) | 4% | 4% |
| Isopar C (Exxon, Inc.) Mainly iso-$C_8$-paraffinics | 62% | 62% |
| Methyl-t.butylether | 10% | 10% |
| CSPIT RESULTS | | |
| Removal of light varnish/sludge | 35% | 75% |
| Removal of carbonized varnish/sludge | 20% | 55% |

*Tramp water content of finished concentrates estimated as about 0.3%.

A comparison van be made to show the beneficial effect of deliberately adding water to another pair of N-methyl-2-pyrrolidone/n.butylamine formulae; e.g. Formulae 69 and 82.

|  | FORMULA 69 | FORMULA 82 |
|---|---|---|
| INGREDIENTS* | | |
| N-Methyl-2-pyrrolidone | 20.5% | 20.0% |
| n.Butylamine | 5.0% | 5.0% |
| Water | 0.3% | 1.4% |
| Lubrizol 8166 Mixture (Lubrizol, Inc.) | 4.0% | 4.0% |
| Isopar C (Exxon, Inc.) Mainly iso-$C_8$-paraffinics | 61.2% | 58.8% |
| Isopropanol (Anhydrous) | — | 10.8% |
| Methyl t.butylether | 9.0% | — |
| pH Value (25° C.) | 12.6 | 13.0 |
| CSPIT RESULTS | | |
| Removal of heavy varnish/sludge | 50% | — |
| Removal of light varnish/sludge | 90% | 93% |
| Removal of carbonized varnish/sludge | 50% | 60% |
| REDUCTION OF TAILPIPE EMISSIONS** | | |
| Unburned hydrocarbon fuel | 81% & 81% | 91%, 52% & 92% |
| Carbon Monoxide | 88% & 86% | 65%, 57% & 90% |

*Tramp water of Formula 69 estimated as 0.3%. (None was specifically added.)
**See more detailed summary sheet that follows.

The summary sheet of data, found in the Experimental Detail Section, on a number of automotive tests shows that in all cases the emission levels of noxious unburned hydro-carbon fuels and carbon monoxide are reduced. Maximum reductions were to 1.5 ppm for unburned hydrocarbons and 0.01 ppm for carbon monoxide, showing the potential of these synergised products.

The scope of the invention will be readily apparent to those skilled in the art, from the above description and examples, which are included to further exemplify the methods of practicing the invention and are not intended to be of limiting scope.

The composition of matter may further comprise an additive selected from the group consisting of lower alkyl alcohols, lubricants, and ethers. Lower alkyl alcohols are to include but not limited to $C_1$ to $C_8$ aliphatic alcohols.

In another embodiment, the composition of matter further comprises ammonia or ammonium hydroxide, more preferably in combination with triethylamine. Most preferably, the triethylamine is present in a concentration of greater than about 10%.

The subject invention provides in a most preferred embodiment, a three-component, mutually synergistic blend, having a high pH value (typically 13.0) and high alkalinity which, when dissolved in a suitable fuel base, may be injected into engines to perform a cleaning function that is dramatically superior to that of any known product.

In one embodiment, a delivery system is required to inject the undiluted product directly into the upper cylinder areas so that it can contact and dissolve the various baked-on partly carbonized varnishes and sludge deposits that are so harmful. To do this, the concentrate is filled into an aerosol container, after which the container is fitted with a suitable valve, sealed and pressurized with nitrogen gas. A supplementary transfer system, consisting of a tube and other components, is used to inject the produce into the engine while it is operating at approximately 2000 rpm. One such system for supplying the pressurized composition is described in U.S. Pat. No. 4,807,578, issued Feb. 28, 1989.

The three-component, mutually synergistic blend is preferably a solution of a simple, five or six-membered heterocyclic ring compound with a simple primary amine, to which a small amount of deionized water is added to enhance potency. This mixture comprises about 25 percent of the formula. Since it is necessary to have the engine running during the approximately five minute injection and cleaning phase, a suitable fuel must be included in the formula. Various gasolines may be used, but for a higher Octane Rating and better product uniformity, the use of a specific commercial mixture of predominantly isomeric isooctanes is recommended. The final required ingredient is a simple aliphatic alcohol, used as a co-solvent to enable the inclusion of a somewhat higher level of water before phase separation occurs. Up to about ten percent of other ingredients may be included as lubricants or for other non-essential purposes. Finally, nitrogen has been found to be the optimum pressurizing gas, since it is not subject to vapor-lock problems during dispensing, provides any desired legal pressure, is useful at a fraction of one percent (thus minimally diluting the concentrate), and is very safe and inexpensive to fill and use.

The subject invention also provides for a pressurized container comprising an amount of the above-described composition and a gas propellant.

The propellant may be selected from the group consisting of nitrogen, air, helium, carbon dioxide, and nitrous oxide, and preferably is nitrogen. The container is then pressurized to 25–180 psi-g.

Nitrogen has been selected as the preferred propellant. It is inexpensive, non-toxic, and develops the more preferred pressure range of about 40–120 psi-g at 70° F., according to the quantity added per can, and does not unduly dilute the concentrate. Additionally, it prevents the vapor-locking found with certain alternative propellants.

One preferred container comprises about 35.0% by weight of N-methyl-2-pyrrolidone; 15.0% by weight of diethylamine; 49.0% by weight of iso-$C_8$-paraffinics; 0.5% by weight of deionized water; and 0.5% by weight of nitrogen gas.

Also provided for is a container which comprises about 35.0% by weight of N-methyl-2-pyrrolidone; 15.0% by weight of isopropylamine; 48.5% by weight of iso-$C_8$-paraffinics; 1.1% by weight of deionized water; and 0.4% by weight of nitrogen gas.

The container may also comprise about 30.0% by weight of tetrahydrofuran; 10.0% by weight of n.butylamine; 45.0% by weight of iso-$C_8$-paraffinics; 0.5% by weight of deionized water; 4.0% by weight of lubrizol 8166 mixture; 10.0% by weight of methyl t.butylether; and 0.5% by weight of nitrogen gas.

Yet another container comprises about 25.0% by weight of butyrolactone; 12.0% by weight of n.pentylamine; 41.0% by weight of unleaded gasoline; 1.0% by weight of deionized water; 10.0% by weight of isopropanol (anhydrous); 10.0% by weight of methyl t.butylether; 0.5% by weight of lubricating oil; and 0.5% by weight of nitrogen gas.

Another container comprises about 18.0% by weight of toluene; 22.0% by weight of n.butylamine; 10.0% by weight of unleaded gasoline; 44.3% by weight of n.$C_{9-10}$-paraffinics; 1.2% by weight of deionized water; 3.9% by weight of methanol (99.5%); and 0.6% by weight of nitrogen gas.

A further container comprises about 30.0% by weight of hydrazine monohydrate; 15.0% by weight of N-methyl-2-pyrrolidone; 42.5% by weight of iso-$C_8$-paraffinics; 12.0% by weight of ethanol (anhydrous); and 0.5% by weight of nitrogen gas.

Another preferred container comprises about 16.0% by weight of mixed isometric xylenes; 24.0% by weight of diethylamine; 49.0% by weight of unleaded gasoline; 0.8% by weight of deionized water; 9.7% by weight of n.propanol; and 0.5% by weight of nitrogen gas.

A further container comprises about 5.0% by weight of N-methyl-2-pyrrolidone; 10.0% by weight of triethylamine; 18.0% by weight of isopropanol (anhydrous); 4.0% by weight of xylene-based lubricant; 10.0% by weight of toluene or xylenes; 49.3% by weight of iso-($C_{7-8}$)-isoparaffins; 3.0% by weight of ammonium hydroxide (28%); and 0.7% by weight of nitrogen gas.

Finally, a container which comprises about 10.0% by weight of N-methyl-2-pyrrolidone; 22.2% by weight of 2-pyrrolidone-1-hydrate; 30.0% by weight of xylenes or toluene; 4.0% by weight of isopropanol (anhydrous); 15.0% by weight of methyl t.butylether; 2.0% by weight of ammonium hydroxide (28%); 1.7% by weight of deionized water; 0.5% by weight of dowfax 2A1 surfactant; 14.0% by weight of triethylamine; and 0.6% by weight of nitrogen gas is provided for. by weight of triethylamine; and 0.6% by weight of nitrogen gas is provided for.

The subject invention also provides a method of dissolving varnish and burned-on sludge in an internal combustion engine which comprises mixing the subject composition with suitable engine fuel to form an admixture and contacting the fuel-exposed areas of the engine with the admixture under conditions such that the varnish and burned-on sludge is dissolved. This may be accomplished by any of the methods known to one skilled in the art, and is to include, but is not limited to, applying the admixture in an aerosol form directly to the fuel line without seriously disturbing the engine's normal fuel line connection, or by forming the admixture in the gas tank using fuel contained therein.

It is recognized that variations in these and related formulas and factors could readily be made within the concepts taught herein. Hence, the invention is intended to be limited only by the scope of the claims and the reasonable equivalents thereof. The following Experimental Detail section is provided to better illustrate the subject invention, and is not to be construed as limiting the subject invention.

Experimental Detail

EXAMPLE 1

An automotive engine injector type cleaner having the composition:

| | |
|---|---|
| N-Methyl-2-pyrrolidone | 35.0% |
| Diethylamine | 15.0% |
| iso-$C_8$-paraffinics | 49.0% |
| De-ionized Water | 0.5% |
| Nitrogen Gas | 0.5% | was prepared by mixing the first three ingredients and then adding water to the point of incipient phase separation. After that the concentrate was packaged and the dispenser gassed with nitrogen propellant. The pH value of the concentrate was 12.5 at 25° C. Removal of varnish/sludge spark plug contaminants by the CSPIT test was 55% for heavy soils, 98% for light soils and 40% for carbonized soils.

EXAMPLE 2

An automotive engine injector type cleaner having the composition:

| | |
|---|---|
| N-Methyl-2-pyrrolidone | 35.0% |
| iso-Propylamine | 15.0% |
| iso-$C_8$-paraffinics | 48.5% |
| De-ionized Water | 1.1% |
| Nitrogen Gas | 0.4% | was prepared as above. The pH value of the concentrate was 12.8 at 25° C. before adding the water, and 13.4 at 25° C. after adding the water. Removal of varnish/sludge spark plug contaminants by the CSPIT test was 55% for heavy soil, 98% for light soils and 60% for carbonized soils. This formula was judge higher in pH and more effective in soil removal than Formula 1.

EXAMPLE 3

An automotive engine injector type cleaner having the composition:

| | |
|---|---|
| Tetrahydrofuran (THF) | 30% |
| n.Butylamine | 10% |
| iso-$C_8$-paraffinics | 45% |
| De-ionized Water | 0.5% |
| Lubrizol 8166 Mixture | 4% |
| Methyl t.butylether | 10% |
| Nitrogen Gas | 0.5% | can be prepared by mixing the ingredients, except water and nitrogen, then adding the water to the point of incipient phase separation. Package and gas with nitrogen propellant. The pH value of the concentrate is 12.6 at 25° C.

EXAMPLE 4

An automotive engine cleaner of the injection type having the composition:

| | |
|---|---|
| Butyrolactone | 25% |
| n.Pentylamine | 12% |
| Unleaded Gasoline | 41% |
| De-ionized Water | 1% |
| Iso-propanol (Anhydrous) | 10% |
| Methyl t.butylether | 10% |
| Lubricating Oil | 0.5% |
| Nitrogen Gas | 0.5% | can be prepared by combining all of the ingredients except water and nitrogen gas, then adding the required amount of water. Package and gas with nitrogen propellant.

EXAMPLE 5

| | |
|---|---|
| Toluene | 18.0% |
| n.Butylamine | 22.0% |
| Unleaded Gasoline | 10.0% |
| n.$C_{9-10}$-paraffinics | 44.3% |
| De-ionized Water | 1.2% |
| Methanol - 99.5% | 3.9% |
| Nitrogen Gas | 0.6% | can be prepared by combining all the ingredients, but adding the water last; then gassing with the nitrogen propellant

EXAMPLE 6

An automotive engine cleaner of the injection type having the composition:

| | |
|---|---|
| Hydrazine Monohydrate | 30.0% |
| N-Methyl-2-pyrrolidone | 15.0% |
| iso-$C_8$-paraffinics | 42.5% |
| Ethanol* (Anhydrous) | 12.0% |
| Nitrogen Gas | 0.5% | can be prepared by mixing items except hydrazine; then adding hydrazine and gas.

EXAMPLE 7

An automotive injector type cleaner having the composition:

| | |
|---|---|
| Mixed Isomeric Xylenes | 16.0% |
| Diethylamine | 24.0% |
| Unleaded Gasolines | 49.0% |
| De-ionized Water | 0.8% |
| n.Propanol | 9.7% |
| Nitrogen Gas | 0.5% | can be prepared by combining all the ingredients except water and nitrogen, then adding the water and gassing with nitrogen propellant.

EXAMPLE 8

An automotive engine injector type cleaner having the composition:

| | |
|---|---|
| N-Methyl-2-pyrrolidone | 5.0% |
| Triethylamine | 10.0% |

| -continued | |
|---|---|
| Isopropanol (Anhydrous) | 18.0% |
| Xylene-based lubricant | 4.0% |
| Toluene (or Xylenes) | 10.0% |
| iso-($C_7$, $C_8$)-isoparaffins | 49.3% |
| Ammonium Hydroxide (28%) | 3.0% |
| Nitrogen Gas | 0.7% | can be prepared by combining all the ingredients, except triethylamine and ammonium hydroxide (28% $NH_3$), in any order, followed by addition of these two ingredients in any order. The dispenser is then sealed and gassed with nitrogen to the desired equilibrium pressure.

This formula is typical of those found to be satisfactory with the recently introduced fluorosilicone automotive gaskets, as well as all others. The compatibility with the fluorosilicone elastomers is based on the use of not more than 10% N-Methyl-2pyrrolidone, and the use of a tertiary aliphatic amine, instead of primary and/or secondary simple aliphatic amines. The water content of this formula is 2.16%. It is rendered soluble by the use of 18.0% isopropanol, in this case, as a co-solvent.

EXAMPLE 9

| N-Methyl-2-pyrrolidone | 10.0% |
|---|---|
| 2-Pyrrolidone 1-Hydrate | 22.2% |
| Xylenes or Toluene | 30.0% |
| Isopropanol (Anhydrous) | 4.0% |
| Methyl tertiary Butyl Ether | 15.0% |
| Ammonium Hydroxide (28%) | 2.0% |
| De-ionized Water | 1.7% |
| Dowfax 2A1 Surfactant | 0.5% |
| Triethyl Amine | 14.0% |
| Nitrogen Gas | 0.6% | can be prepared as indicated for Example 7.

This formula is cited to show that the usual iso-($C_7$, $C_8$)-paraffinic solvent or diluent may be replaced by other liquids of high fuel value. It has a pH of 11.5 at 77° F. and exceptional soil removal capabilities. Gaskets such as EPDM-70, Buna-N and the fluorosilicones are swelled slightly during typical use conditions, but no degradational effects, such as mushing or delamination have been noted.

The combination of ammonium hydroxide (28% $NH_3$) and tertiary amine effectively simulates the solvent and sludge removal activities of the primary and secondary simple aliphatic amines that were the object of much of the early work in this area.

NOTATIONS REGARDING ENGINE OPERATIONS

Rationales for injector type automotive engine cleaners include the reduction of unburned fuel (hydrocarbons), the reduction of partly burned fuel (carbon monoxide and other compounds), the re-seating of valves, so that gasoline loss and loss of compression do not occur, the renovation of spark plugs, to give better conductivity, optimum sparking voltage and longer service life, and better engine performance, by reducing the rate at which gasoline enters the lubricating oil, and other factors. Clean engines are recognized to operate more smoothly, burn fuels more completely, and exhibit better mileage per gallon. They also contribute far less to ground-level air pollution problems. With an appropriate catalytic converter the injection of unburned hydrocarbons, carbon monoxide and noxious partly burned chemicals into the air is reduced to essentially zero.

Unburned or partly burned fuels result from several sources:
a. A bad ratio of fuel to air. (1 volume of gaseous fuel to 14.7 volumes of air is ideal.)
b. Bad spark timing. (Must be advanced about 10° to ideally augment residual piston travel.)
c. Low compression. (Caused by poorly seated and leaking valves, plus other factors.)

Improper ratios of fuel to air prevent the attainment of the stoichiometric or ideal combustion ratio of fuel to air. If the fuel is in excess there will be insufficient oxygen to completely burn it, and pollutants will be formed in the combustion chamber. If an excess of air is present, it will act to dilute and slightly cool the combustion process, making it less efficient. Incomplete mixing, resulting in "hot spots" of fuel and air, will reduce efficiency. When spongey build-ups of carbonaceous materials encrust the upper cylinder walls and other nearby surfaces, they are able to absorb a tiny portion of the gasoline that is jetted into the chamber between firings. When the spark plug is energized the airborne gasoline mist is burned, and some of the absorbed gasoline burns upon the surface of the incrustation. As this occurs, the piston moves into its blank or exhaust stroke, reducing chamber pressure, and causing much more of the absorbed gasoline to be leached out. If this also burns (depending upon engine conditions) there is no utile result. In fact, the result is counter-productive, causing hot gases and pressure to form while the engine is in the exhausting mode. The car must be manually or automatically adjusted to use additional fuel to compensate for that lost between spark-induced explosions. Any condition that prevents part of the fuel to be absent from the airborne mist around the spark plug when it fires will serve to make the car readjust to a richer fuel-to-air mixture, decrease combustion efficiency, and decrease mileage per gallon.

Carbonized or "dirty" carburetor-type engines produce about 2000 ppm of unburned hydrocarbon vapors. If they are fairly clean, this may drop to 900 ppm or so. If one inserts new or cleaned injectors the emission level drops to 200 ppm. If one additionally cleans the engine chambers with Formula #212 or another optimum composition of this invention, then emissions will sink to 50 ppm or less—and to zero after the catalytic converter.

Carbonized or "dirty" fuel injector type engines typically produce about 1000 ppm of unburned hydrocarbon vapors. By using clean injectors this will decrease to 150 to 200 ppm, and by cleaning the engine chambers emissions will subside to less than 50 ppm. After the converter emissions will be zero.

Typical emissions for engines in reasonably clean condition will be 180 to 300 ppm. of unburned hydrocarbons. Base levels for premium grade gasolines are about 200 ppm, and for ordinary unleaded gasolines, about 240 ppm. At these levels, a catalytic converter in good condition will still reduce the exhaust pipe hydrocarbon emissions to about zero. This shows that the corrective effect of using the injector type engine cleaner, described in this invention, is relatively long lasting, causing cars with catalytic converters to release virtually no unburned hydrocarbon air pollutants for many months after treatment with the product.

The voltage of the discharge across the spark plug is an important consideration. It is measured in kilovolts (kV). Lower kV values indicate better conductivity.

Although the coil can provide up to about 50 kV on demand, the optimum value for Toyotas (for example) is 6 to 7 kV, although up to about 9 kV is not considered problematic. This presumes normal spark plug gaps of about 0.040" to 0.080". Still considering the Toyota, at 12 kV the spark is considered too hot, indicative of a dirty plug. At 3 kV the spark is considered to be too cool, suggesting carbon build-up. Carbon is somewhat conductive, and its accretion at the spark plug gap area has the effect of diminishing gap distance, allowing the spark to jump across at lower voltages than otherwise.

Toyotas in average engine condition show reading of about 10 kV. After the spark plugs are cleaned with optimum cleaners of this invention, gap voltage drops to the ideal value of about 7 kV. At above 7 kV one would consider that problems exist in the air/fuel mixture, such as poor compositions, hotspots of air or gasoline vapor. At relatively high kVs (above 13) both the oxygen and the fuel become non-conductive at the gap. Some dirty engines are found to develop oscillations in peak kV values, reflecting rich and lean fuel/air mixtures. Cleaned plugs and well mixed fuel and air act to improve engine performance by bringing the plugs to about 7 kV and improving combustion efficiency.

During normal running conditions the engine intake valves tend to slowly become dirty, with carbon or coking deposits behind the close-off acting to prevent it from properly seating. When the engine fires and compression of the atmosphere above the pistons takes place, various amounts of unburned gas and pressure are lost as they move past the close-off point and back up the valve vestibule. An engine that loses gas and pressure is one that cannot operate efficiently and provide optimum miles per gallon.

In the Toyota and certain other automobiles the intake valves are of the non-rotating type, which exacerbates the bad seating and back-flow problems.

In contrast to the intake valves, there is no build up in the exhaust valves, since they operate to discharge very hot gas mixtures from the combustion process. The extreme heat prevents carbonaceous build-ups at these ports.

Engine injection cleaners of the type described in this invention are able to remove at least 30 to 50% of the coking deposits, thus allowing intake valves to properly re-seat—unless they have been previously warped or burnt by the deposits. Providentially, the cleaner preferentially removes the amorphous carbon deposits but has little effect upon the hard, shiny graphitic under-layer. Graphite is, of course, a well-recognized high temperature solid state lubricant, and this is also advantageous in allowing the seat to tightly reseal the valve opening between fuel jets. The seat metal itself (very hard steel) becomes very metallic and highly visible as a result of the cleaning program.

Fuel intake valves that have become encrusted with coke deposits in and around the seat suffer from yet another problem. Due to the highly uneven character of the deposits, when the pressurized fuel is directed into the upper cylinder chamber it does not emerge from the valve in an even mist that can quickly produce a more-or-less homogeneous mixture with the air for optimum combustion. Instead, it emerges as a plurality of individualized jets and plumes that take longer to assimilate into the air in the chamber. If sparking and combustion take place before homogeneity can be established, the hot-spots and starved spots will burn with lower efficiency, causing unburned or partially burned hydrocarbons to be exhausted. The reduced efficiency will obviously lead to a reduction in miles per gallon of fuel, plus the potential for ground-level air pollution.

These several areas of discussion are presented to explain the underlying rationales for using the injection cleaners according to this invention: how the product beneficially affects automobile and truck engines in order to produce such benefits as smooth performance, less pollutant generation, increased mileage, less wear and warping of key components, longer spark plug life and other salubrious effects.

During the very lengthy experimental program leading to the optimum products we have described, a substantial number of injector type cleaners, currently on the market, have been tested for cleaning ability and related properties. Rather surprisingly, none of these competitive formulations demonstrated any significant cleaning ability. The label claims were reviewed and considered to be highly puffed and grossly misleading. Consumer disgruntlement is well recognized, and has undoubtedly been a key factor in making the market for this type of product a very limited one with no growth or vigor.

To the present time about 230 formulations have been prepared and tested in various ways to define the possibilities for producing a product that will:

a. Provide maximum cleaning of the spark plug and upper cylinder areas of both gasoline and diesel engines, when about 300 grams are injected during a 5 to 10 minute period.
b. Allow the engine to idle and run up to about 2500 rpm without unusual roughness or other problems.
c. Not dissolve or corrode metals, such as steel, brass or aluminum, that might contact the formulation.
d. Not unduly swell, delaminate or dissolve elastomeric materials, such as fluorosilicone, EPDM (70-Durometer) or Buna N (70-Durometer) that might contact the formulation.
e. Not attack the aerosol can or its dispensing valve.
f. Not contain any toxic, carcinogenic, mutagenic, teratogenic or oncogenic constituents or impurities.
g. Not contain any ingredients that could poison the catalytic converter, or have strong colors or odors.
h. Be formulated from commonly available, TSCA-registered ingredients and packaging components.
i. Be economical for the consumer to purchase.
j. Present the least flammability hazard consistent with the other objectives.

With the unexpected finding of strong cleaning synergism between the heterocyclics and/or aromatics, and certain primary and secondary amines, these objectives were attained, until the fluorosilicone gasket made its appearance.

This relatively unique gasketing material made its commercial debut with the 1989 models of one U.S.A. and one European-made can. At that time 82 formulations had been tested, and the last of these (number 82) considered to be fully satisfactory for use. However, when tested with cars having the new fluorosilicone gasket, the gasket softened in 2 to 3 minutes and dissolved in 4 to 5 minutes. Gasket replacement involved high costs, and made the product totally unsuitable for such cars.

Studies with the fluorosilicone gasket quickly showed that iso.propylamine, n.butylamine and diethylamine were able to dissolve it in 2, 2, and 12 minutes, resp. These amines could not be used in the product, and other amines would have to be carefully checked.

Shortly afterward it was found that ammonium hydroxide solutions (typically 29% ammonia in water), and triethylamine had no effect on fluorosilicones. Fortunately, ammonium hydroxide exhibited a strong synergistic and potentiating effect upon the heterocyclics and/or aromatics, and this effect was augmented by the addition of at least about 10% trietylamine. Surprisingly, the triethylamine had no synergistic effect when used in the absence of ammonium hydroxide.

A lengthy process began, where various candidate formulations were checked to identify trends and parameters, with the aim of developing a highly synergized optimum product that would satisfy the ten criteria just mentioned.

The most effective combination, involving a four-way synergistic effect, is:
N-Methyl-2-pyrrolidone
Triethylamine
Ammonia Gas ($NH_3$) and Water
Toluene or Mixed Xylenes The N-Methyl-2-pyrrolidone is the most effective solvent and synergistic cohort of the various simple heterocyclic compounds that have been studied. Similarly, xylene is the most effective of the benzenoid aromatics that have been studied, from standpoints of solvency and synergism.

Even as little as about 0.3% ammonium hydroxide (29% $NH_3$ solution in water) strongly synergizes and thus greatly enhances the cleaning ability of N-Methyl-2-pyrrolidone and xylenes. Water alone exerts a modest potentiating effect on the cleaning ability of M-Methyl-2-pyrrolidone/Triethylamine formulations, but with ammonium hydroxide the effect is far greater.

The addition of at least 10% Triethylamine to such formulations still further increases solvency for burned on engine varnishes and carbonized deposits.

A secondary benefit for using Triethanolamine is that it dissolves water in all proportions, and thus, in present formulations can be used to dissolve the aqueous portion of the ammonium hydroxide solution. For reasons as yet unclear, formulations where the ammonium hydroxide is just at the brink of insolubility/solubility are those which display the greatest cleaning ability. In some instances a clear solution will dissolve 60% of various spark plug deposits, where essentially the identical composition, but slightly turbid, will dissolve essentially 100%.

Through refinements of the formulation, including the testing of an added 145 formulations, in vitro and in automobiles, compositions that provide up to 85% soil removal have been made, and it may be possible to increase performance up to 90%—see Experimental Results; page 24.

In order to assure that the engine will run at least reasonably well during the injection period of about 6 to 10 minutes a sufficient amount of fuel must be included in the formula. Xylene appears to be a more effective fuel than the aliphatic hydrocarbons, such as iso-($C_7$)-Paraffinics, and this, plus its synergistic effect is why it is preferred embodiment of the invention.

NOTE: Xylenes are very slightly superior to toluene.

EXPERIMENTAL RESULTS
THESE RESULTS, PRESENTED IN TABULAR FORMAT, SUMMARIZE RESEARCH CONDUCTED TO DEVELOP SYNERGISTIC SOLVENT BLENDS FOR THE CLEANING OF SPARK PLUGS AND UPPER CYLINDER AREAS WHEN INJECTED INTO AUTOMOTIVE GASOLINE AND DIESEL ENGINES BAKED ON RESIDUE REMOVAL BY INDIVIDUAL SOLVENTS, BINARY SOLVENT BLENDS AND FULLY FORMULATED CONCENTRATE BLENDS, WHEN APPLIED TO AREAS AROUND THE AUTOMOTIVE SPARK PLUG GAP FOR ABOUT FIVE MINUTES

INDIVIDUAL SOLVENTS

| | \multicolumn{10}{c}{Formula Number:} | | | | | | | | | |
|---|---|---|---|---|---|---|---|---|---|---|
| | 001 | 002 | 003 | 004 | 005 | 006 | 007 | 008 | 009 | 010 |
| Hydrazine | 100 | — | — | — | — | — | — | — | — | — |
| Diethylene Triamine | — | 100 | — | — | — | — | — | — | — | — |
| n.Butylamine | — | — | 100 | — | — | — | — | — | — | — |
| Diethylamine | — | — | — | 100 | — | — | — | — | — | — |
| Triethylamine | — | — | — | — | 100 | — | — | — | — | — |
| Tetrahydrofuran | — | — | — | — | — | 100 | — | — | — | — |
| N-Methyl-2-pyrrolidone | — | — | — | — | — | — | 100 | — | — | — |
| 4-Butyrolactone | — | — | — | — | — | — | — | 100 | — | — |
| Dibutylamine | — | — | — | — | — | — | — | — | 100 | — |
| Ethylene Glycol n.Butyl Ether (As Dowanol EB) | — | — | — | — | — | — | — | — | — | 100 |
| Soil Removal* | 8.0 | 1.0 | 6.0 | 3.5 | 0.3 | 1.0 | 1.5 | 0.5 | 0.3 | 0.1 |

INDIVIDUAL AND BINARY SOLVENTS

| | \multicolumn{10}{c}{Formula Number:} | | | | | | | | | |
|---|---|---|---|---|---|---|---|---|---|---|
| | 011 | 012 | 013 | 014 | 015 | 016 | 017 | 018 | 019 | 020 |
| Lubrizol 8166 Mixture | 100 | — | — | — | — | — | — | — | — | — |
| Toluene | — | 100 | — | — | — | — | — | — | — | — |
| Methyl Ethyl Ketone | — | — | 100 | — | — | — | — | — | — | — |
| n.Butyl Acetate | — | — | — | 100 | — | — | — | — | — | — |
| Methylene Chloride | — | — | — | — | 100 | — | — | — | — | — |
| iso.Propylamine | — | — | — | — | — | 100 | — | — | — | — |
| N-Methyl-2-pyrrolidone | — | — | — | — | — | — | 25 | 50 | 75 | 90 |
| n.Butylamine | — | — | — | — | — | — | 75 | 50 | 25 | 10 |
| Soil Removal* | 0.1 | 0.2 | 0.1 | 0.1 | 0.0 | 5.0 | 5.0 | 9.3 | 9.7 | 9.0 |

*Arbitrary Scale.  0 = None   10 = Excellent (Ess. total)
The strong synergism in the N-Methyl-2-pyrrolidone/n.Butylamine system is shown by Formulas No. 017–021.

RESIDUE REMOVAL BY FORMULATED SOLVENT BLENDS, WHEN APPLIED TO AREAS
AROUND THE AUTOMOTIVE SPARK PLUG GAP FOR FIVE MINUTES

| Formula Number: | 021 | 022 | 023 | 024 | 025 | 026 | 027 | 028 | 029 | 030 |
|---|---|---|---|---|---|---|---|---|---|---|
| N-Methyl-2-pyrrolidone | 95 | — | — | — | — | — | 25 | 50 | 75 | 90 |
| n.Butylamine | 5 | 75 | 50 | 25 | 10 | 5 | — | — | — | — |
| Tetrahydrofuran (THF) | — | 25 | 50 | 75 | 90 | 95 | — | — | — | — |
| Diethylamine | — | — | — | — | — | — | 75 | 50 | 25 | 10 |
| Soil Removal* | 1.3 | 2.5 | 7.0 | 7.0 | 7.0 | 1.0 | 7.5 | 8.0 | 8.0 | 8.0 |

*Arbitrary Scale. 0 = None 10 = Excellent (Ess. total)
The strong synergism of the Tetrahydrofuran/n.Butylamine system is shown by Formulas No. 022-026.

| Formula Number: | 031 | 032 | 033 | 034 | 035 | 036 | 037 | 038 | 039 | 040 |
|---|---|---|---|---|---|---|---|---|---|---|
| N-Methyl-2-pyrrolidone | 95 | — | — | — | — | — | 25 | 50 | 75 | 90 |
| n. Butylamine | — | 75 | 50 | 25 | 10 | 5 | — | — | — | — |
| 4-Butyrolactone (4BLO) | — | 25 | 50 | 75 | 90 | 95 | — | — | — | — |
| Diethylamine | 5 | — | — | — | — | — | — | — | — | — |
| iso.Propylamine | — | — | — | — | — | — | 75 | 50 | 25 | 10 |
| Soil Removal* | 1.0 | 4.0 | 7.0 | 7.0 | 4.0 | 1.0 | 2.5 | 6.0 | 8.5 | 8.0 |

*Arbitrary Scale. 0 = None 10 = Excellent (Ess. total)
The strong synergism of the Tetrahydrofuran/Diethylamine system is shown by Formulas No. 027-031.
The moderate synergism of the 4-Butyrolactone/n.Butylamine system is shown by Formulas No. 032-036.
The strong synergism of the N-Methyl-2-pyrrolidone/iso.Propylamine system is shown by Formulas No. 037-041.
The strong synergism of the 2-Pyrrolidone/Triethylamine/NH3 system is shown later, by Formulas No. 191 and 193-196.

| Formula Number: | 041 | 042 | 043 | 044 | 045 | 046 | 047 | 048 | 049 | 050 |
|---|---|---|---|---|---|---|---|---|---|---|
| N-Methyl-2-pyrrolidone | 95 | — | — | — | — | — | — | — | — | — |
| n.Butylamine | — | 75 | 50 | 25 | 10 | 5 | 75 | 50 | 25 | 10 |
| Toluene | — | 25 | 50 | 75 | 90 | 95 | — | — | — | — |
| iso.Propylamine | 5 | — | — | — | — | — | — | — | — | — |
| Ethylene Glycol n.Butyl Ether (As Dowanol EB) | — | — | — | — | — | — | 25 | 50 | 75 | 90 |
| Soil Removal* | 7.0 | 7.5 | 8.8 | 5.0 | 1.5 | 0.5 | 6.0 | 1.8 | 1.8 | 1.8 |

*Arbitrary Scale. 0 = None 10 = Excellent (Ess. total)
The strong synergism of the Toluene/n.Butylamine system is shown by Formulas No. 042-046.

| Formula Number: | 051 | 052 | 053 | 054 | 055 | 056 | 057 | 058 | 059 | 060 |
|---|---|---|---|---|---|---|---|---|---|---|
| Lubrizol 8163 Mixture | — | 25 | 50 | 75 | 90 | 95 | — | — | — | — |
| n.Butylamine | 5 | 75 | 50 | 25 | 10 | 5 | 75 | 50 | 25 | 10 |
| Methyl tert.Butyl Ether | — | — | — | — | — | — | 25 | 50 | 75 | 90 |
| Ethylene Glycol n.Butyl Ether (As Dowanol EB) | 95 | — | — | — | — | — | — | — | — | — |
| Soil Removal* | 0.5 | 7.5 | 5.0 | 5.0 | 2.0 | 1.0 | 4.0 | 3.0 | 2.0 | 1.5 |

*Arbitrary Scale. 0 = None 10 = Excellent (Ess. total)
The modest synergism of the Ethylene Glycol n.Butyl Ether/n.Butylamine system is shown by Formulas No. 047-051.
The slight synergism of the Lubrizol 8163 Mixture/n.Butylamine system is shown by Formulas No. 052-056.
The negligable synergism of the Ethylene Glycol n.Butyl Ether/n.Butylamine system is shown by Formulas No. 057-061.

| Formula Number: | 061 | 062 | 063 | 064 | 065 | 066 | 066 | 067 | 068 | 069 | 070 | 071 |
|---|---|---|---|---|---|---|---|---|---|---|---|---|
| N-Methyl-2-pyrrolidone | — | — | — | — | — | — | 20 | 20 | 20 | 21 | 21 | 21 |
| n.Butylamine | 5 | 75 | 50 | 25 | 10 | 5 | 10 | — | — | 5 | — | — |
| iso-(C7)-paraffinics | — | 25 | 50 | 75 | 90 | 95 | 61 | 61 | 61 | 61 | 61 | 61 |
| Methyl tert.Butyl Ether | 95 | — | — | — | — | — | 9 | 9 | 9 | 9 | 9 | 9 |
| iso.Propylamine | — | — | — | — | — | — | — | 10 | — | — | 5 | — |
| Diethylamine | — | — | — | — | — | — | — | — | 10 | — | — | 5 |
| Soil Removal* | 0.0 | 4.0 | 4.0 | 2.0 | 1.0 | 0.0 | 3.3 | 5.0 | 5.8 | 2.7 | 5.2 | 4.0 |

*Arbitrary Scale. 0 = None 10 = Excellent (Ess. total).
No synergism exists for the iso-(C7)-Paraffinics/n.Butylamine system, as shown by Formulas No. 062-066.
Comparing Formulas No. 066 -068, diethylamine looks better than primary amines iso.Propylamine and n.Butylamine.
Comparing Formulas No. 069-071, iso.propylamine looks best, but Diethylamine is close.
The mediocre values of synergistic Formulas No. 066 -071 represent the diluting effects of the iso-(C7)-Paraffinics and Methyl tert.Butyl Ether. (These are needed to allow engines to run, and for economics.)
There are variable, but non-measurable amounts of water in the amine reagents which are affecting the results very significantly. The amounts are thought to be 0.5 to 1.0% in the final formulas. The water allows pH potentiation, and thus better solvency.
There are two formulas identified as 0.66; cited here as 066 and 066 .

THREE TYPES OF SLUDGE DEPOSITS TESTED

| NO. | CHEMICAL NAME | PERCENT | SLUDGE A | SLUDGE B | SLUDGE C | AVERAGE |
|---|---|---|---|---|---|---|
| 072. | N-Methyl-2-pyrrolidone | 21.0 | (Two-phase concentrate; test aborted.) | | | |
| | n.Butylamine | 2.5 | | | | |
| | Lubrizol 8166 | 4.0 | | | | |
| | Iso-(C7)-paraffins | 63.0 | | | | |
| | Methyl t.butylether | 9.5 | | | | |
| 073. | N-Methyl-2-pyrrolidone | 21.0 | (Two-phase concentrate; test aborted.) | | | |
| | iso.Propylamine | 2.5 | | | | |
| | Lubrizol 8166 | 4.0 | | | | |
| | Iso-(C7)-paraffins | 63.0 | | | | |
| | Methyl t.butylether | 9.5 | | | | |
| 074. | N-Methyl-2-pyrrolidone | 21.0 | (Two-phase concentrate; test aborted.) | | | |
| | Diethylamine | 2.5 | | | | |
| | Lubrizol 8166 | 4.0 | | | | |
| | Iso-(C7)-paraffins | 63.0 | | | | |

| | RESIDUE REMOVAL BY FORMULATED SOLVENT BLENDS, WHEN APPLIED TO AREAS AROUND THE AUTOMOTIVE SPARK PLUG GAP FOR FIVE MINUTES | | | | | |
|---|---|---|---|---|---|---|
| | Methyl t.butylether | 9.5 | | | | |
| 075. | N-Methyl-2-pyrrol-idone | 20.0 | (Single-phase concentrate, but too close to composition of two-phase to commercialize. Test aborted.) | | | |
| | iso.Propylamine | 4.0 | | | | |
| | Lubrizol 8166 | 4.0 | | | | |
| | Iso-($C_7$)-paraffins | 62.5 | | | | |
| | Methyl t.butylether | 9.5 | | | | |
| 076. | | | | | | |
| 077. | N-Methyl-2-pyrrol-idone | 35.0 | | | | |
| | n.Butylamine | 15.0 | 55 | — | — | 55 pH = 12.8 |
| | iso-($C_7$)-Paraffins | 49.84 | | | | |
| | De-ionized water | 0.16 | | | | |
| 078. | N-Methyl-2-pyrrol-idone | 20.5 | 50 | 95 | 50 | 63 |
| | n.Butylamine | 5.0 | | | | |
| | Lubrizol 8166 Mix. | 4.0 | 50 | 90 | 50 | 63 |
| | iso-($C_7$)-paraffins | 61.2 | | 95 | | |
| | Methyl t.Butyl Ether | 9.0 | | | | |
| | De-ionized water pH = 13.0 | 0.3 | | | | |
| 079. | N-Methyl-2-pyrrol-idone | 35.00 | | | | |
| | n.Butylamine | 15.00 | — | 98 | 60 | 79 |
| | Iso-($C_7$)-paraffins | 48.97 | 55 | 98 | 50 | 68 pH = 13.2 |
| | Water | 1.03 | | | | |
| 080. | N-Methyl-2-pyrrol-idone | 35.00 | | | | |
| | iso.Propylamine | 15.00 | — | 98 | 60 | 79 |
| | Iso-($C_7$)-paraffins | 48.89 | 55 | 98 | 60 | 71 pH = 13.4 |
| | Water | 1.11 | | | | |
| 081. | N-Methyl-2-pyrrol-idone | 35.00 | | | | |
| | Diethylamine | 15.00 | — | 90 | 50 | 70 |
| | Iso-($C_7$)-paraffins | 49.50 | 55 | 98 | 40 | 64 pH = 12.5 |
| | Water | 0.50 | | | | |
| 069A. | N-Methyl-2-pyrrol-idone | 20.0 | | | | |
| | n.Butylamine | 5.0 | | | | |
| | Lubrizol 8166 | 4.0 | 50 | 93 | 50 | 63 pH = 13.0 |
| | Iso-($C_7$)-paraffins | 59.0 | | | | |
| | Isopropanol (Anhyd.) | 11.7 | | | | |
| | Water | 0.3 | | | | |
| 082. | N-Methyl-2-pyrrol-idone | 20.0 | | | | |
| | n.Butylamine | 5.0 | | | | |
| | Lubrizol 8166 | 4.0 | — | 90 | | |
| | Iso-($C_7$)-paraffins | 58.8 | — | 95 | 60 | 76 |
| | Isopropanol (Anhyd.) | 10.8 | | | | |
| | Water pH = 13.0 | 1.4 | | | | |
| 084. | N-Methyl-2-pyrrol-idone | 9.78 | | | | |
| | Amm. Hydroxide (29%) | 0.30 | | | | |
| | Lubrizol 8166 | 3.91 | — | Works | Works | — |
| | Iso-($C_7$)-paraffins | 78.19 | | | | |
| | Isopropanol (Anhyd.) pH = 12.2 | 7.82 | | | | |
| 085. | N-Methyl-2-pyrrol-idone | 10.55 | | | | |
| | Amm. Hydroxide (29%) | 0.75 | | | | |
| | Lubrizol 8166 | 4.22 | — | | | |
| | Iso-($C_7$)-paraffins | 73.93 | | | | |
| | Isopropanol (Anhyd.) pH = 12.5 | 10.55 | | | | |
| 086. | N-Methyl-2-pyrrol-idone | 5.00 | | | | |
| | Triethylamine | 10.00 | — | Works (90 mins.) | Works (90 mins.) | Works (90 m) |
| | Lubrizol 8166 | 4.00 | | | | |
| | Amm. Hydroxide (29%) | 1.00 | | | | |
| | Iso-($C_7$)-paraffins pH = 12.6 | 70.00 | | | | |
| 087. | N-Methyl-2-pyrrol-idone | 10.0 | | | | |
| | Triethylamine | 10.0 | | | | |
| | Lubrizol 8166 | 4.0 | — | Poor | — | Poor |
| | Amm. Hydroxide (29%) | 0 | | | | |
| | Iso-($C_7$)-paraffins | 66.0 | | | | |
| | Isopropanol (Anhyd.) | 10.0 | | | | |
| 088. | N-Methyl-2-pyrrol- | 5.0 | | | | |

RESIDUE REMOVAL BY FORMULATED SOLVENT BLENDS, WHEN APPLIED TO AREAS AROUND THE AUTOMOTIVE SPARK PLUG GAP FOR FIVE MINUTES

-continued

| | | | | | | |
|---|---|---|---|---|---|---|
| | idone | | | | | |
| | Triethylamine | 10.0 | — | Very Good | Very Good | Very Good |
| | Lubrizol 8166 | 4.0 | | | | |
| | Iso-(C$_7$)-paraffins | 70.5 | | | | |
| | Isopropanol (Anhyd.) | 10.0 | | | | |
| | Amm. Hydroxide (29%) | 0.5 | | | | |
| 089. | N-Methyl-2-pyrrol- | 0 | | | | |
| | idone | | | | | |
| | Triethylamine | 10.0 | | | | |
| | Lubrizol 8166 | 4.0 | — | | | |
| | Iso-(C$_7$)-paraffins | 70.5 | | | | |
| | Isopropanol (Anhyd.) | 10.0 | | | | |
| | Amm. Hydroxide (29%) | 0.5 | | | | |
| 090. | N-Methyl-2-pyrrol- | 5 | | | | |
| | idone | | | | | |
| | Triethylamine | 10 | | | | |
| | Lubrizol 8166 | 4 | — | | | |
| | Amm. Hydroxide (29%) | 1 | | | | |
| | Iso-(C$_7$)-paraffins | 70 | | | | |
| | Isopropanol (Anhyd.) | 10 | | | | |
| 091. | N-Methyl-2-pyrrol- | — | | | | |
| | idone | | | | | |
| | Triethylamine | 10 | | | | |
| | Lubrizol 8166 | 4 | — | | | |
| | Amm. Hydroxide (29%) | 1 | | | | |
| | Iso-(C$_7$)-paraffins | 74 | | | | |
| | Isopropanol (Anhyd.) | 10 | | | | |
| 092A. | N-Methyl-2-pyrrol- | 2 | | | | |
| | idone | | | | | |
| | Triethylamine | 10 | | | | |
| | Lubrizol 8166 | 4 | — | | | 70 |
| | Amm. Hydroxide (29%) | 5 | | | | |
| | Iso-(C$_7$)-paraffins | 69 | | | | |
| | Isopropanol (Anhyd.) | 10 | | | | |
| 092B. | N-Methyl-2-pyrrol- | — | | | | |
| | idone | | | | | |
| | Triethylamine | 10 | | | | |
| | Lubrizol 8166 | 4 | — | | | 65 |
| | Amm. Hydroxide (29%) | 5 | | | | |
| | Iso-(C$_7$)-paraffins | 71 | | | | |
| | Isopropanol (Anhyd.) | 10 | | | | |
| 092C. | N-Methyl-2-pyrrol- | 5 | | | | |
| | idone | | | | | |
| | Triethylamine | 10 | | | | |
| | Lubrizol 8166 | 4 | — | | | 70 |
| | Amm. Hydroxide (29%) | 2 | | | | |
| | Iso-(C$_7$)-paraffins | 69 | | | | |
| | Isopropanol (Anhyd.) | 10 | | | | |
| 092D. | N-Methyl-2-pyrrol- | 5 | | | | |
| | idone | | | | | |
| | Triethylamine | 10 | | | | |
| | Lubrizol 8166 | 4 | — | | | 80 |
| | Amm. Hydroxide (29%) | 3 | | | | |
| | Iso-(C$_7$)-paraffins | 63 | | | | |
| | Isopropanol (Anhyd.) | 15 | | | | |
| 093. | N-Methyl-2-pyrrol- | 2 | | | | |
| | idone | | | | | |
| | Triethylamine | 10 | | | | |
| | Lubrizol 8166 | 4 | — | | | 65 |
| | Amm. Hydroxide (29%) | 5 | | | | |
| | Iso-(C$_7$)-paraffins | 59 | | | | |
| | Isopropanol (Anhyd.) | 20 | | | | |
| 094. | N-Methyl-2-pyrrol- | 5 | | | | |
| | idone | | | | | |
| | Triethylamine | 10 | | | | |
| | Lubrizol 8166 | 4 | — | | | 80 |
| | Amm. Hydroxide (29%) | 3 | | | | |
| | Iso-(C$_7$)-paraffins | 60 | | | | |
| | Isopropanol (Anhyd.) | 18 | | | | |
| 095. | N-Methyl-2-pyrrol- | — | | | | |
| | idone | | | | | |
| | Triethylamine | 10 | | | | |
| | Lubrizol 8166 | 4 | — | | | 70 |
| | Amm. Hydroxide (29%) | 5 | | | | |
| | Iso-(C$_7$)-paraffins | 51.5 | | | | |
| | Isopropanol (Anhyd.) | 29.5 | | | | |
| 096. | N-Methyl-2-pyrrol- | 5 | | | | |
| | idone | | | | | |
| | Toluene | 10 | | | | |
| | Triethylamine | 10 | | | | |

RESIDUE REMOVAL BY FORMULATED SOLVENT BLENDS, WHEN APPLIED TO AREAS AROUND THE AUTOMOTIVE SPARK PLUG GAP FOR FIVE MINUTES -continued

|  |  |  |
|---|---|---|
|  | Lubrizol 8166 | 4 |
|  | Amm. Hydroxide (29%) | 3 |
|  | Iso-(C$_7$)-paraffins | 50 |
|  | Isopropanol (Anhyd.) | 18 |
| 097A. | N-Methyl-2-pyrrolidone | 5 |
|  | Toluene | 20 |
|  | Triethylamine | 10 |
|  | Lubrizol 8166 | 4 |
|  | Amm. Hydroxide (29%) | 3 |
|  | Iso-(C$_7$)-paraffins | 43 |
|  | Isopropanol (Anhyd.) | 15 |
| 097B. | N-Methyl-2-pyrrolidone | 5 |
|  | Toluene | 20 |
|  | Triethylamine | 10 |
|  | Lubrizol 8166 | 4 |
|  | Amm. Hydroxide (29%) | 3 |
|  | Iso-(C$_7$)-paraffins | 42 |
|  | Isopropanol (Anhyd.) | 16 |
| 098. | N-Methyl-2-pyrrolidone | 5 |
|  | Toluene | 30 |
|  | Triethylamine | 10 |
|  | Lubrizol 8166 | 4 |
|  | Amm. Hydroxide (29%) | 3 |
|  | Iso-(C$_7$)-paraffins | 34 |
|  | Isopropanol (Anhyd.) | 14 |
| 099. | N-Methyl-2-pyrrolidone | 5 |
|  | Toluene | 15 |
|  | Triethylamine | 10 |
|  | Lubrizol 8166 | 4 |
|  | Amm. Hydroxide (29%) | 3 |
|  | Iso-(C$_7$)-paraffins | 45 |
|  | Isopropanol (Anhyd.) | 18 |
| 100A. | N-Methyl-2-pyrrolidone | 5 |
|  | Toluene | 15 |
|  | Triethylamine | 10 |
|  | Lubrizol 8166 | 4 |
|  | Amm. Hydroxide (29%) | 6 |
|  | Iso-(C$_7$)-paraffins | — |
|  | 2-Nitropropane | 40 |
|  | Isopropanol (Anhyd.) | 20 |
| 100B. | N-Methyl-2-pyrrolidone | 5 |
|  | Toluene | 15 |
|  | Triethylamine | 10 |
|  | Lubrizol 8166 | 4 |
|  | Amm. Hydroxide (29%) | 6 |
|  | Iso-(C$_7$)-paraffins | — |
|  | 1-Nitropropane | 40 |
|  | Isopropanol (Anhyd.) | 20 |

Sludge A: A heavy crust of burned-on oil sludge.
Sludge B: A light crust of burned-on oil sludge.
Sludge C: Black, carbonized deposit of sludge.
The following formulas and results will be provided in a condensed fashion, giving only one result for relative soil removal from plugs.

| Formula Number: | 101 | 102 | 103 | 104 | 105 | 106 | 107 | 108 | 109 | 110 |
|---|---|---|---|---|---|---|---|---|---|---|
| N-Methyl-2-pyrrolidone | 5 | 5 | 5 | 5 | 5 |  |  | 5 | — | — |
| Toluene | 15 | 15 | 15 | 15 | 15 |  |  | 15 | — | — |
| Triethylamine | 10 | 10 | 10 | 10 | 10 |  |  | 10 | — | — |
| Lubrizol 8166 | 4 | 4 | 4 | 4 | 4 |  |  | 4 | — | — |
| Ammonium Hydroxide (29%) | 6 | 3 | 5 | 5 | 5 |  |  | 3.5 | — | — |
| Iso-(C$_7$)-paraffinics | — | 48 | 26 | 16 | 10 |  |  | 25.5 | — | — |
| 1 Nitropropane | 45 | — | 20 | 30 | 36 |  |  | — | 75 | — |
| Isopropanol (Anhydrous) | 15 | 15 | 15 | 15 | 15 |  |  | 17 | — | — |
| 2-Nitropropane | — | — | — | — | — |  |  | 20 | — | 75 |
| n.Butylamine | — | — | — | — | — |  |  | — | 25 | 25 |
| Sludge A Removal (%) |  |  |  |  |  |  |  |  | 60 | 80 |
| Sludge B Removal (%) |  |  |  |  |  |  |  |  | 80 | 95 |
| Sludge C Removal (%) |  |  |  |  |  |  |  |  | — |  |
| Average Removal |  |  |  |  |  |  |  | 70 | 70 | 88 |
| pH Value (25° C.) |  |  |  |  |  |  |  | 10.0 |  |  |

In all formulas there are small amounts of water present. In formulas up to No. 79 this is tramp moisture, estimated as 0.2 to 0.8%, due to its presence in n.butylamine and other items as received, and due to the hydroscopic nature of amines, causing them to absorb moisture from the air. This water cannot be quantified by Karl Fischer Methods or other normal means, due to the activity of the concentrate. It contributes greatly to cleaning activity. Formulas after No. 79 contain water, added as such or by the addition of ammonium hydroxide (29% NH$_3$ & 71% water).

RESIDUE REMOVAL BY FORMULATED SOLVENT BLENDS, WHEN APPLIED TO AREAS AROUND THE AUTOMOTIVE SPARK PLUG GAP FOR FIVE MINUTES

| Formula Number: | 111 | 112 | 113 | 114 | 115 | 116 | 117 | 118 | 119 | 120 |
|---|---|---|---|---|---|---|---|---|---|---|
| N-Methyl-2-pyrrolidone | 10 | 10 | 10 | 10 | 10 | 10 | 10 | 10 | 10 | 10 |
| Toluene | 15 | 15 | 15 | 15 | 15 | 15 | 15 | 15 | 15 | 15 |
| Triethylamine | 8 | 8 | 8 | 8 | 8 | 8 | 7 | 7 | 7 | 7 |
| Lubrizol 8166 | 4 | 4 | 4 | 4 | 4 | 4 | 4 | 4 | 4 | 4 |
| Ammonium Hydroxide (29%) | — | .5 | 1 | 2 | — | 2.5 | 1 | 1.3 | 1.5 | 2 |
| Iso-($C_7$)-paraffinics | 41 | 40.5 | 40 | 39 | 40 | 33.5 | 40 | 39.2 | 38.5 | 38 |
| 2-Nitropropane | 20 | 20 | 20 | 20 | 20 | 20 | 20 | 20 | 20 | 20 |
| Isopropanol (Anhydrous) | — | — | — | — | — | 5 | — | — | — | — |
| Deionized Water | — | — | — | — | 1 | — | — | — | — | — |
| iso-Propylamine | 2 | 2 | 2 | 2 | 2 | 2 | 3 | 3 | 3 | 3 |
| Witcamide 511 | — | — | — | — | — | — | .5 | 1 | 1 | 1 |
| Soil Removal* | 5.0 | 5.0 | 6.0 | 6.0 | 6.0 | 7.5 | 7.5 | | 7.5 | 7.5 |
| pH Value (25° C.) | 10.4 | 10.4 | 10.3 | 11.4 | 10.5 | 10.8 | 10.3 | 10.5 | 11.3 | 11.2 |

*Arbitrary Scale. 0 = None. 10 = Excellent (Ess. Total)

| Formula Number: | 121 | 122 | 123 | 124 | 125 | 126 | 127 | 128 | 129 | 130 |
|---|---|---|---|---|---|---|---|---|---|---|
| N-Methyl-2-pyrrolidone | 10 | 10 | 10 | 10 | 10 | 5 | 10 | 10 | 7.5 | 5 |
| Toluene | 15 | 15 | 15 | 15 | 15 | 15 | 15 | 15 | 15 | 15 |
| Triethylamine | 6 | 8 | 8 | 6.5 | 6.5 | 5 | 10 | 15 | 17.5 | 20 |
| Lubrizol 8166 | 4 | 4 | 4 | 4 | 4 | 4 | 4 | 4 | 4 | 4 |
| Ammonium Hydroxide (29%) | 1.5 | 1.5 | 2 | — | 1.5 | 1.5 | 4 | 4 | 4 | 4 |
| Iso-($C_7$)-paraffinics | 34.5 | 33 | 31.5 | 33.5 | 33.5 | 37.5 | 20 | 20 | 20 | 20 |
| 2-Nitropropane | 23 | 24 | 24 | 24 | 24 | 25 | 20 | 20 | 20 | 20 |
| Isopropanol (Anhydrous) | — | — | — | — | — | — | 17 | 12 | 12 | 12 |
| De-ionized Water | — | — | — | 1.5 | — | — | — | — | — | — |
| iso-Propylamine | 3.5 | 3.5 | 3.5 | 3.5 | — | 5 | — | — | — | — |
| n.Butylamine | — | — | — | — | 3.5 | — | — | — | — | — |
| Witcamide 511 | 2 | 1 | 2 | 2 | 2 | 2 | — | — | — | — |
| Soil Removal* | 7.5 | 7.5 | 7.5 | 6.5 | 7.0 | 7.5 | 7.5 | 8.5 | | |
| pH Value (25° C.) | 11.2 | | 11.1 | 11.0 | 11.1 | 11.2 | | 10.8 | 11.2 | 11.1 |

*Arbitrary Scale. 0 = None 10 = Excellent (Ess. Total)
Formula 128 is outstanding; better than formula 108.

| Formula Number: | 131 | 132 | 133 | 134 | 135 | 136 | 137 | 138 | 139 | 140 |
|---|---|---|---|---|---|---|---|---|---|---|
| N-Methyl-2-pyrrolidone | 7.5 | 5 | 5 | 5 | 5 | 5 | 5 | 5 | 5 | 5 |
| Toluene | 15 | 15 | 15 | 15 | 15 | 15 | 15 | 15 | 10 | 10 |
| Triethylamine | 17.5 | 20 | 10 | 10 | 10 | 10 | 10 | 10 | 10 | 10 |
| Lubrizol 8166 | 4 | 4 | 4 | 4 | 4 | 4 | 4 | 4 | 4 | 4 |
| Ammonium Hydroxide (29%) | 4 | 4 | 4 | 4 | 4 | 4 | 4 | 3.5 | 4 | 4 |
| Iso-($C_7$)-paraffinics | — | — | — | — | — | — | 10 | 20 | 27 | 26 |
| 2-Nitropropane | 40 | 40 | 50 | 48 | 47 | 46.5 | 35 | 25.5 | 20 | 20 |
| Isopropanol (Anhydrous) | 12 | 12 | 12 | 14 | 15 | 15.5 | 17 | 17 | 20 | 21 |
| Soil Removal* | | | | | | | | | | |

Notations:
133: Clear at first, then becomes turbid.
134: Clear at first, then becomes turbid.
135: Clear at first, rapidly becomes turbid.
136: Very faint turbidity.
137: Very faint turbidity.
138: Some engine pings, on run down.
139: Clear at first, then becomes turbid.
140: Clear.

| Formula Number: | 141 | 142 | 143 | 144 | 145 | 146 | 147 | 148 | 149 | 150 |
|---|---|---|---|---|---|---|---|---|---|---|
| N-Methyl-2-pyrrolidone | 5 | 5 | 5 | 5 | 5 | 5 | 5 | 5 | 5 | 5 |
| Toluene | 10 | 10 | 10 | 10 | 10 | 10 | 10 | 10 | 10 | 10 |
| Triethylamine | 5 | 5 | 5 | 5 | 5 | — | 4 | 4 | 4 | 4 |
| Lubrizol 8166 | 4 | 4 | 4 | 4 | 4 | — | 4 | 4 | 4 | 4 |
| Ammonium Hydroxide (29%) | — | 1 | 2 | 3 | 4 | — | — | 1 | 2 | 3 |
| Iso-($C_7$)-paraffinics | 31 | 30 | 29 | 28 | 27 | 45 | 41 | 40 | 39 | 38 |
| 2-Nitropropane | 20 | 20 | 20 | 20 | 20 | 20 | 20 | 20 | 20 | 20 |
| Isopropanol (Anhydrous) | 20 | 20 | 20 | 20 | 20 | 20 | 20 | 20 | 20 | 20 |
| Soil Removal* | | | | | | | | | | |
| pH Value (25° C.) | 10.6 | 10.7 | 10.7 | 10.8 | 10.8 | 5.4 | 7.8 | 10.3 | 10.7 | 10.8 |

| Formula Number: | 151 | 152 | 153 | 154 | 155 | 156 | 157 | 158 | 159 | 160 |
|---|---|---|---|---|---|---|---|---|---|---|
| N-Methyl-2-pyrrolidone | 5 | 5 | 5 | 5 | 5 | 5 | 10 | 10 | 10 | 10 |
| Toluene | 10 | 10 | 10 | 10 | 10 | 10 | 10 | 10 | 10 | 10 |
| Triethylamine | — | 10 | 10 | 10 | 10 | — | 10 | 10 | 10 | 10 |
| Lubrizol 8188 | 4 | 4 | 4 | — | — | — | 4 | 4 | 4 | 4 |
| Ammonium Hydroxide (29%) | 4 | 4 | 3.5 | 4 | 3.5 | 4 | 1.5 | 2 | 1 | 2 |
| Iso-($C_7$)-paraffinics | 37 | 27 | 29.5 | 31 | 33.5 | 41 | 37 | 36 | 40 | 52 |
| 2-Nitropropane | 20 | 20 | 20 | 20 | 20 | 20 | 20 | 20 | 20 | 20 |
| Isopropanol (Anhydrous) | 20 | 20 | 18 | 20 | 18 | 20 | 7.5 | 8 | 5 | 10 |
| Soil Removal* | 5.0 | 4.8 | 5.0 | 7.3 | 6.0 | 5.3 | | | | |
| pH Value (25° C.) | 10.9 | 10.6 | 10.6 | 10.6 | 10.6 | 11.0 | | | | |

*Arbitrary Scale. 0 = None 10 = Excellent (Ess. total)
156: Soil removal results somewhat skewed because of turbidity.

| Formula Number: | 161 | 162 | 163 | 164 | 165 | 166 | 167 | 168 | 169 | 170 |
|---|---|---|---|---|---|---|---|---|---|---|

-continued

RESIDUE REMOVAL BY FORMULATED SOLVENT BLENDS, WHEN APPLIED TO AREAS AROUND THE AUTOMOTIVE SPARK PLUG GAP FOR FIVE MINUTES

| | | | | | | | | | | |
|---|---|---|---|---|---|---|---|---|---|---|
| N-Methyl-2-pyrrolidone | 10 | 10 | 10 | 10 | 10 | 10 | 10 | 10 | 10 | 10 |
| Toluene | 10 | — | 5 | 15 | 20 | 24 | 24 | 20 | 15** | 20* |
| Triethylamine | 10 | 10 | — | 10 | 10 | 10 | 10 | 10 | 10 | 10 |
| Lubrizol 8188 | 4 | 4 | 4 | 4 | 4 | 4 | 4 | 4 | 4 | 4 |
| Ammonium Hydroxide (29%) | 1 | 2 | 4 | 2 | 2 | 2 | 2 | 2 | 2 | 2 |
| Iso-($C_7$)-paraffinics | 53 | 44 | 37 | 29 | 24 | 24 | 20 | 24 | 49 | 44 |
| 2-Nitropropane | — | 20 | 20 | 20 | 20 | 16 | 20 | 20 | — | — |
| Isopropanol (Anhydrous) | 10 | 10 | 20 | 10 | 10 | 10 | 10 | 10 | 10 | 10 |
| Soil Removal* | | | | | | | | | | |
| pH Value (25° C.) | | | | | | | | | | |

*Arbitrary Scale. 0 = None 10 = Excellent (Ess. total.)
**Mixed Xylenes.
168: Not run, due to flow problems.
169: Slightly turbid. Ran much more smoothly than #170. Gave 1% separation in 25 minutes; no further change in 72 hours (75° F.). Gave 10 to 15% separation in 12 hours at 0° F. 5.06 g coupon of nickel gave blue oxidation in 16 hours; lost 0.16 g over 7 days. 2.45 g coupon of chrome steel gave rust-colored oxidation in 16 hours.
170: Clear.

| Formula Number: | 171 | 172 | 173 | 174 | 175 | 176 | 177 | 178 | 179 | 180 |
|---|---|---|---|---|---|---|---|---|---|---|
| N-Methyl-2-pyrrolidone | 10 | 10 | 10 | 10 | 99 | — | 90 | 95 | 60 | 50 |
| Mixed Xylene Isomers | 13 | 18 | 19 | 19 | — | — | — | — | 30 | 30 |
| Triethylamine | 10 | 10 | 10 | 10 | — | — | 10 | — | 9½ | 19½ |
| Lubrizol 8188 | 4 | — | — | — | — | — | — | — | — | — |
| Ammonium Hydroxide (29%) | 2 | 2 | 2 | 2 | 1 | 100 | — | 5 | — | — |
| Iso-($C_7$)-paraffinics | 47 | 46 | 46 | 47 | — | — | — | — | — | — |
| Isopropanol (Anhydrous) | 14 | 14 | 13 | 12 | — | — | — | — | — | — |
| De-ionized Water | — | — | — | — | — | — | — | — | ½ | ½ |
| Soil Removal* | | | | | 9.6 | 8.8 | 8.8 | 9.5 | 9.0 | 8.3 |
| pH Value (25° F.) | | | | | 13.0 | 13.0 | 12.2 | 13.2 | 11.6 | 11.6 |

*Arbitrary Scale. 0 = None 10 = Excellent (Ess. total)
171: Clear.
172: Clear.
173: Clear.
174: Slightly turbid.
176: No solubility.
177: Cannot run engine.
179: Engine runs fairly well at 1500 rpm and higher. Rough idle.
180: Engine runs a little better than with #179.

| Formula Number: | 181 | 182 | 183 | 184 | 185 | 186 | 187 | 188 | 189 | 190 |
|---|---|---|---|---|---|---|---|---|---|---|
| N-Methyl-2-pyrrolidone | 50 | 47 | 50 | 35 | 20 | — | — | — | — | 90 |
| Mixed Xylene Isomers | 40 | — | 29½ | 40 | 55 | — | — | — | — | — |
| Triethylamine | 10 | 10 | 10 | 10 | 10 | 10 | — | 10 | — | 10 |
| Ammonium Hydroxide (29%) | — | — | — | — | — | — | 1 | — | 1 | — |
| Methyl tertiary Butyl Eth. | — | — | 10 | 15 | 15 | — | — | — | — | — |
| Iso-($C_7$)-paraffinics | — | 38 | — | — | — | — | — | — | — | — |
| Isopropanol (Anhydrous) | — | 5 | — | — | — | — | — | — | — | — |
| De-ionized Water | — | — | ½ | — | — | — | — | — | — | — |
| Tetrahydrofuran | — | — | — | — | — | 90 | 99 | — | — | — |
| 4-Butyrolactone | — | — | — | — | — | — | — | 90 | 99 | — |
| Soil Removal* | | | | | | 2.8 | 9.0 | 5.5 | 5.5 | 6.8 |
| pH Value (25° C.) | | | 11.6 | | | | | 11.9 | | 11.6 |

*Arbitrary Scale. 0 = None 10 = Excellent (Ess. total)
181: Engine doesn't run as smoothly as with #179.
182: Cannot run engine.
183: Fluorosilicone gasket test: Lasts 20 minutes (120° F. & 30 psi-g.)
184: Fluorosilicone gasket test: Lasts 60 to 120 m. (120° F. & 30 psi-g.)
186: Fluorosilicone gasket test: Lasts 25 minutes (120° F. & 30 psi-g.)
187: Fluorosilicone gasket test: Lasts 10 min. max. (120° F. & 30 psi-g.)
188/90: Very good spark plug soil solubility.

| Formula Number: | 191 | 192 | 193 | 194 | 195 | 196 | 197 | 198 | 199 | 200 |
|---|---|---|---|---|---|---|---|---|---|---|
| N-Methyl-2-pyrrolidone | — | — | — | — | — | — | — | — | — | — |
| Mixed Xylene Isomers | — | 30 | 30 | 30 | 30 | 30 | 30 | 30 | 25 | 25 |
| Triethylamine | — | 10 | 10 | 8 | — | 9 | 10 | 9 | 9 | 9 |
| Ammonium Hydroxide (29%) | 1 | — | — | 2 | 2 | 1 | — | 1 | 1 | 1 |
| Methyl tert.Butyl Ether | — | 10 | 10 | 10 | 10 | 10 | 10 | 10 | 15 | 15 |
| 4-Butyrolactone | — | 50 | — | — | — | — | 50 | 50 | 35 | 15 |
| 2-Pyrrolidone-1-hydrate | 99 | — | 50 | 50 | 58 | 50 | — | — | — | 35 |
| Soil Removal* | 6.8 | | | | | | 2.0 | 8.0 | 8.0 | 6.0 |
| pH Value (25° C.) | 11.9 | | 11.0 | 11.7 | 11.9 | | | | | |

*Arbitrary Scale. 0 = None 10 = Excellent (Ess. total).
191: Solubility is good to very good.
194: Fluorosilicone gasket test: Lasts about 180 minutes.
195: Fluorosilicone gasket test: Lasts about 300 minutes.

COMPATABILITY COMPARISON TESTS

| Test | Material | Formula No. 193 | Champion Cleaner |
|---|---|---|---|
| Immersion (5 days at 120° F.) | Nickel | 0.00 g Wt. Loss | 0.00 g Wt. Loss |
| | Cadmium | 0.00 g Wt. Loss | 0.00 g Wt. Loss |
| | Brass | min. g Wt. Loss | 0.00 g Wt. Loss |
| | Aluminum | 0.00 g Wt. Loss | 0.00 g Wt. Loss |
| Immersion Weight | Fluorosil. | — | (Very little change) |

-continued

RESIDUE REMOVAL BY FORMULATED SOLVENT BLENDS, WHEN APPLIED TO AREAS AROUND THE AUTOMOTIVE SPARK PLUG GAP FOR FIVE MINUTES

| Gain in 10 hours at Ambient Temp. | EPDM Buna-N | | | | 15% 37% | | | | 27% 16% | |
|---|---|---|---|---|---|---|---|---|---|---|
| Formula Number: | 201 | 202 | 203 | 204 | 205 | 206 | 207 | 208 | 209 | 210 |
| N-Methyl-2-pyrrolidone | 10 | 10 | 10 | 10 | 10 | 10 | 10 | 10 | 10 | 10 |
| Mixed Xylene Isomers | 30 | 30 | 35 | 30 | 30 | 30 | 30 | — | — | 30 |
| Triethylamine | 9 | 9 | 9 | 14 | 16 | 14 | 14 | 9 | 9 | 29 |
| Ammonium Hydroxide (29%) | 1 | 1 | 1 | 1 | 1 | 1 | 1 | 1 | 1 | 1 |
| Methyl tert.Butyl Ether | 10 | 15 | 15 | 15 | 15 | 15 | 15 | 10 | 10 | 15 |
| 4-Butyrolactone | 40 | 35 | 30 | 30 | 28 | 28 | 26 | 40 | 40 | 15 |
| Aromatic 100 Solvent | — | — | — | — | — | — | — | 30 | — | — |
| Aromatic 150 Solvent | — | — | — | — | — | — | — | — | 30 | — |
| | | | | | | | IPA = 4 | | | |
| Soil Removal* | 8.3 | | | | 6.0 | | 8.3 | 5.2 | 5.8 | 7.0 |
| pH Value (25° C.) | | | | | 11.1 | | 11.0 | | | |

*Arbitrary Scale. 0 = None 10 = Excellent (Ess. total.)
201: Engine runs roughly at 1000 to 2000 rpm. Will not idle. Fluorosilicone gasket test: Lasts about 300 minutes. Six day immersion at 75° F. (% weight gain): EPDM = 27.3% Buna-N = 15.2%
202: Engine runs smoothly at 1000 to 2000 rpm. Has a rough idle.
203: Engine does not run as well as with Formula #202.
204: Engine runs better than with Formula #202. Also idles better. Tests of self-pressurized (with N₂) Fuel Injector Cleaner:

Swelling of ToyoGuard Gaskets (%)

| Gasket | Durometer | Temp. (°F.) | Vertical | Horizontal |
|---|---|---|---|---|
| EPDM | 70 | 75 | 26.0 | 24.2 |
| Buna-N | 70 | 75 | 8.9 | 6.6 & 9.0 |
| EPDM | 70 | 120 | 26.0 | 25.0 |
| Buna-N | 70 | 120 | 7.9 | 6.6 & 7.5 |

205: Engine runs and idles a bit roughly, but better than #204 & #207. Swells EPDM-70 by 15.1% vertically and 14.0% horizontally. Swells Buna-70 by 22.9% vertically and 23.0% horizontally.
207: Engine runs a little roughly at 2000 rpm, but idles well. Exceptional soil removal, with 200 g added over a 9 m. period. Swells EPDM-70 by 15.1% vertically and 11.8% horizontally. (Swelling subsides to 1.0% and 0.7%, resp. after 24 hrs. air-dry.) Swells Buna-70 by 22.2% vertically and 22.0% horizontally.
208: In 24 hours, swells EPDM-70 by 13.9% vertically and 13.7% horiz. In 24 hours, swells Buna-70 by 24.2% vertically.
209: Runs engine similar to Formula #201; possibly a bit more roughly. In 24 hours, swells EPDM-70 by 15.9% vertically and 15.7% horiz. In 24 hours, swells Buna-70 by 23.6% vertically.
210: Runs and idles engine a little rougher than ToyoGuard R In 24 hours, swells EPDM-70 by 20.2% vertically and 16.7% horiz. In 24 hours, swells Buna-70 by 19.3% vertically and 19.5% horiz.

| Formula Number: | 211 | 212 | 213 | 214 | 215 | 216 | 217 | 218 | 219 | 220 |
|---|---|---|---|---|---|---|---|---|---|---|
| N-Methyl-2-pyrrolidone | 10 | 10 | 10 | 10 | 10 | 10 | 10 | 10 | 10 | 12 |
| Mixed Xylene Isomers | | 30 | 30 | 30 | 30 | 30 | 30 | 30 | 30 | 42 |
| Triethylamine | | 14 | 12 | 12 | 10 | 14 | 14 | 14 | 13 | 5 |
| Ammonium Hydroxide (29%) | | — | 1 | 2 | 3 | 3 | 2 | 1 | 2 | 2 |
| Methyl tert.Butyl Ether | | 15 | 15 | 15 | 15 | 15 | 15 | 15 | 15 | 15 |
| Isopropanol | (Anhydrous) | | 4.3 | 8 | 7 | 8 | 8 | 4 | 6 | 6 4 |
| Deionized Water | | 0.7 | — | — | — | — | — | — | — | — |
| 4-Butyrolactone | 10 | 26 | 24 | 24 | 24 | 20 | 25 | 24 | 24 | 30 |
| Soil Removal* | 3.0 | 6.8 | 7.8 | 8.3 | 8.0 | 5.2 | 8.1 | 7.3 | 3.0 | 5.8 |
| pH Value (25° C.) | | | | | | | | 11.3 | 11.2 | |

*Arbitrary Scale. 0 = None 10 = Excellent (Ess. total.)
211: In 24 hours, swells EPDM-70 by 23.6% vertically and 21.0% horiz. In 24 hours, swells Buna-70 by 17.5% vertically and 18.0% horiz.
213: Swells EPDM-70 by 13.1% vertically and 13.8% horizontally. Swells Buna-70 by 22.9% vertically and 22.0% horizontally.
215: Swells EPDM-70 by 14.7% vertically and 15.7% horizontally. Swells Buna-70 by 21.9% vertically and 22.4% horizontally.
217: Swells EPDM-70 by 15.9% vertically and 14.3% horizontally. Swells Buna-70 by 24.6% vertically and 23.8% horizontally. After 24 hours at 120° F.: EPDM swells by 17.4% & Buna-70 swells by 23.6%
220: Swells EPDM-70 by 15.9% vertically and 14.3% horizontally. Swells Buna-70 by 23.9% vertically and 23.8% horizontally.

GASKET SWELL VERSUS EXPOSURE TIME AT 70° F. (%)

| Immersion Time (hours) | Formula #207 | | Formula #217 | | Formula #218 | |
|---|---|---|---|---|---|---|
| | EPDM | Buna | EPDM | Buna | EPDM | Buna |
| 1.0 | 4.6 | 6.9 | 4.6 | 7.9 | 4.6 | 7.9 |
| | 5.1 | 5.7 | 6.2 | 5.7 | 6.2 | 5.4 |
| 2.0 | 6.6 | 11.2 | 6.6 | 11.2 | 6.6 | 11.2 |
| | 7.5 | 8.8 | 7.9 | 8.8 | 7.9 | 8.8 |
| 4.5 | 9.8 | 15.0 | 9.8 | 15.0 | 9.8 | 15.0 |
| | 9.1 | 15.4 | 9.1 | 15.4 | 9.1 | 15.4 |
| 6.0 | 11.1 | 17.5 | 10.6 | 17.5 | 11.1 | 17.5 |
| | 10.7 | 18.5 | 10.7 | 18.6 | 10.7 | 18.5 |
| 48.0 | — | — | 12.7 | 19.7 | — | — |

GASKET SWELL VERSUS EXPOSURE TIME AT 70° & 120° F. (%)

| Solvent | Immersion Time (hrs) | Temperature = 70°F. | | Temperature = 120° F. | |
|---|---|---|---|---|---|
| | | EPDM | Buna | EPDM | Buna |
| N-Methyl-2-pyrrolidone | 2 | — | — | −0.5 | 18.6 |
| N-Methyl-2-pyrrolidone | 24 | −0.5 | 27.1 | — | — |
| 2-Pyrrolidone 1-Hydrate | 2 | — | — | −1.1 | 4.4 |
| 2-Pyrrolidone 1-Hydrate | 24 | 0.0 | 6.9 | — | — |
| 4-Butyrolactone | 2 | — | — | −0.5 | 13.4 |
| 4-Butyrolactone | 24 | 0.0 | 21.2 | — | — |
| Mixed Xylene Isomers | 2 | — | — | 24.1 | 7.9 |

RESIDUE REMOVAL BY FORMULATED SOLVENT BLENDS, WHEN APPLIED TO AREAS AROUND THE AUTOMOTIVE SPARK PLUG GAP FOR FIVE MINUTES -continued

| | | | | | |
|---|---|---|---|---|---|
| Mixed Xylene Isomers | 24 | 30.7 | 12.1 | — | — |
| Methyl tert.Butyl Ether | 2 | — | — | 20.6 | 2.2 |
| Methyl tert.Butyl Ether | 24 | 24.5 | 5.4 | — | — |
| Triethylamine | 2 | — | — | 29.3 | — |
| Triethylamine | 24 | 30.2 | 0.0 | — | — |

Maximum Swelling: EPDM: With triethylamine or xylenes.
Methyl tert.Butyl Ether is next.
Buna-N: N-Methyl-2-pyrrolidone.
4-Butyrolactone is next.

| Formula Number: | 221 | 222 | 223 | 224 | 225 | 226 | 227 | 228 | 229 | 230 |
|---|---|---|---|---|---|---|---|---|---|---|
| N-Methyl-2-pyrrolidone | 10 | 10 | | | | | | | | |
| 2-Pyrrolidone 1-Hydrate | 25 | 22.8 | | | | | | | | |
| Mixed Xylene Isomers | 29 | 30 | | | | | | | | |
| Triethylamine | 20 | 14 | | | | | | | | |
| Ammonium Hydroxide (29%) | 2 | 2 | | | | | | | | |
| Methyl tert.Butyl Ether | — | 15 | | | | | | | | |
| Isopropanol (Anhydrous) | 4 | 4 | | | | | | | | |
| Aromatic 150 Solvent | 10 | — | | | | | | | | |
| De-ionized Water | — | 1.7 | | | | | | | | |
| Dowfax 2A1 Surfactant | — | 0.5 | | | | | | | | |
| Soil Removal:* | 8.3 | | | | | | | | | |
| pH Value (25° C.): | | 11.5 | | | | | | | | |

*Arbitrary Scale. 0 = None 10 = Excellent (Ess. total.)
221: Has demonstrated very good cleaning on heavily crusted soils, lightly crusted soils and black, carbonized soils near spark gaps. Swells EPDM-70 by 12.3% after 24 hours at 120° F., and by 15.9% after 48 hours at 70° F. Swells Buna N (70-Durometer) by 20.4% after 24 hours at 120° F., and by 20.9% after 48 hours at 70° F. Swells both EPDM-70 and Buna N (70-Durometer) by 15.8% after 48 hours at 120° F.
222: Swells EPDM-70 by 16% and Buna N (70-Durometer) by 20% after 48 hour exposures at 70° F. Typical orange-colored, laminated fluoro-elastomers are eventually de-laminated (never dissolved or "mushed") upon 48 to 72 hour contact at 70° F. Note: With n.Butylamine and iso-propyl-amine formulas, for example, these gaskets are rapidly wrinkled and then "mushed". The combination of Triethylamine and Ammonium Hydroxide (29% NH$_3$), for higher pH value, simulates the soil removal actions of primary and secondary amine formulations, but without the intense depradational effects on fluoro-elastomer gaskets. This formula has been successfully demonstrated to buyers, as has #97.

FORMULA PROPERTY REVIEW SHEET

| FORMULAS | |
|---|---|
| 72 to 75 | 20% M-Pyrol & 63% Isopar C may be immiscible, without 4% or more of simple primary or secondary amine present. |
| 79 to 82 | 35% M-Pyrol & 15% n.BuNH$_2$ in Isopar C is only slightly better than 20% M-Pyrol & 5% n.BuNH$_2$ in Isopar C, in cleaning ability. 15% i.PrNH$_2$ is equal to 15% n.BuNH$_2$ and better than 15% (Et)$_2$NH. (1% of added H$_2$O present in each.) |
| 84 to 88 | Adding up to 10% (Et)$_3$N to 5 to 10% M-Pyrol & 0.3 to 1.0% Amm.Hydrox. in Isopar C gives good cleaning. (W/o Amm.Hydrox., cleaning is poor.) 0.5% Amm.Hydrox. may be optimum. |
| 92A to D | Addition of M-Pyrol up to 10%, in 10% (Et)$_3$N and 3 to 5% Amm.Hydrox. systems improves cleaning only slightly. 5% M-Pyrol is optimum. Some may be two-phase, as 92A and 92B. |
| 93 to 95 | Addition of M-Pyrol up to 5%, in 10% (Et)$_3$N and 3 to 5% Amm.Hydrox. systems improves cleaning somewhat. 5% M-Pyrol is better than 2%. One or more may be two-phase, as 93. |
| 109-110 | 75% 2-nitropropane in 25% n.BuNH$_2$ is a very good cleaner, and better than 75% 1-nitropropane in 25% n.BuNH$_2$. (Compare to 75% Isopar & 25% nBuNH$_2$) |
| 111-120 | 2-Nitropropane (at 20%) and Toluene (at 15%) add nothing to cleaning. Amm.Hydrox. is vital to cleaning. As low as 1% (with 3% or more of i.PrNH$_2$ or n.BuNH$_2$) to 4% can be used. Check phase separation possibility on over 1.5% Amm.Hydrox. #117 is most preferred in group; has good cleaning (7.5). |
| 121-130 | Adding Witcamide 511 does not improve cleaning. 2-Nitropropane (at 20%) and Toluene (at 15%) add nothing to cleaning. For 10% M-Pyrol formulas, increasing (Et)$_3$N from 10 to 15% improves cleaning, provided 4% solubilized Amm.Hydrox. is present. Amm.Hydrox. is vital to cleaning, even with up to 3.5% i.PrNH$_2$ present. |
| 131-140 | For continued one-phase concentrate, where 4% Amm.Hydrox. is present, use at least 21% Isopropanol. To reduce engine pings, consider replacing toluene and 2-nitropropane with additional Isopar C (giving 57% Isopar C). |
| 141-150 | (No data.) |
| 151-156 | Formula #154 (highest in Amm.Hydrox.) gives best cleaning (7.3). It may be compared with #128 as follows: |

| | 128 | 154 | |
|---|---|---|---|
| M-Pyrol | 10 | 5 | N-Methyl-2-pyrrolidone |
| Toluene | 15 | 10 | |
| (Et)$_3$N | 15 | 10 | Triethylamine |
| Lubrizol 8188 | 4 | — | |
| Amm.Hydrox. (29%) | 4 | 4 | |
| Isopar C | 20 | 31 | Iso-(C$_7$)-paraffinics |
| 2-Nitropropane | 20 | 20 | |
| Isopropanol (Anh) | 12 | 20 | |
| Soil Removal | 8.5 | 7.3 | |
| pH Value (25° C.) | 10.8 | 10.6 | |

Criteria for success appear to be:
  a. Use 4% Amm.Hydrox. with 20% or more Isopropanol. (Anhydrous) to solutilize the water.
  b. Use at least 50% more Et$_3$N than M-Pyrol.
  c. Use the practical maximum of M-Pyrol, consistant with good engine performance and solubility of water present in the formula. (Recommend 10% minimum.)

| | |
|---|---|
| 157-160 | No data. Suspect some are two-phase and all are mediochre cleaners. |
| 161-170 | No pH or cleaning data. Suspect all are two-phase and mediochre clrs. |
| 171-174 | No pH or cleaning data. At least 12% Isopropanol (Anhydrous) is needed to solublize 2% Amm.Hydrox. Predict mediochre cleaning. |
| 175-180 | Unworkable formulas, for directional guidance only. At M-Pyrol levels of over 60%, cleaning is generally over 9.0. Addition of traces of Amm.Hydrox. appear helpful. |
| 181-185 | Mixed Xylene Isomers appear better than Isopar C as |

FORMULA PROPERTY REVIEW SHEET -continued

| FORMULAS | |
|---|---|
| | engine fuel, allowing engine to run in some cases where Isopar C will not. At over about 30% of either M-Pyrol, Tetrahydrofuran (THF) or similar structures, properties of fluorosilicone gaskets may be irreversibly impaired if exposures exceed an hour or two, at 120° F. and 30 psi-g. |
| 186–190 | M-Pyrol, Tetrahydrofuran (THF) and 4-Butyrolactone are poor to fair cleaners, without Amm.Hydrox. and or primary or secondary amines. ($Et_3$)N is of no real benefit. |
| 191 | The heterocyclics, with 1% Amm.Hydrox. can be compared for cleaning ability (academically) as follows: |

CLEANING EFFICACY OF 99% HETEROCYCLICS WITH 1% AMMONIUM HYDROXIDE (70° F.)

| Heterocyclic | Cleaning Ability |
|---|---|
| N-Methyl-2-pyrrolidone (M-Pyrol) | 9.6 |
| Tetrahydrofuran (THF) | 9.0 |
| 4-Butyrolactone (4BLO) | 5.5 |
| 2-Pyrrolidone 1-Hydrate (2-Pyrol) | 6.8 |

This suggests a general preference for M-Pyrol as the heterocyclic of choice.
Addition of 10% Triethylamine to M-Pyrol greatly inhibited soil removal - down to 6.8. (Refer to item 151-156, b. & c.) It is possible that M-Pyrol & Triethylamine $Et_3N$ are antagonistic over some ratios.

| 192–196 | No cleaning data. $Et_3N$ may exert a slight delaminating effect on fluorosilicones. |
|---|---|
| 197–201 | Replacing 10% 4BLO with 10% M-Pyrol (#197 to #201) changes 8.0 to 8.5, confirming that the M-Pyrol is a preferred heterocyclic cleaner. In #197, $Et_3N$/4BLO is amost useless without Amm.Hydrox. 4BLO/2-Pyrol is inferior to 4BLO alone. It is doubtful that these formulas will run an automobile engine. |
| 202–210 | Formula 207 has 10% M-Pyrol & 14% $Et_3N$ (see #151 to #156, b. & c.) which is a favorable ratio, so cleaning is high - 8.3, even with only 1% Amm.Hydrox. Formula #210 has a ratio of 25% heterocyclics [M-Pyrol + 4BLO] to 19% $Et_3N$. The 16% excess of $Et_3N$ is insufficient for good synergism, so cleaning is only moderate. A 50% excess is needed (#128). Gasket swell data will be discussed separately below. |
| 211–220 | Formula #214 has 34% heterocyclics [M-Pyrol + 4BLO] to 12% $Et_3N$. The large excess of heterocyclics aids cleaning. Result is 8.3. Formula #217 is similar. Result is 8.1. Conversely, Formula #216 has a lower ratio (30% heterocyclics to 14% $Et_3N$) and is less effective as a cleaner. Result is 5.2. The bad result of Formula #219 is unexplained. |
| 221–222 | Formula #221 has 35% heterocyclics [M-Pyrol & 2-Pyrol] to 20% $Et_3N$. The 39% of aromatics "adds" to the heterocyclic influence, to provide an acceptable excess over the $Et_3N$. Result is 8.3 |

RESIDUE REMOVAL BY FORMULATED SOLVENT BLENDS, WHEN APPLIED TO AREAS AROUND THE AUTOMOTIVE SPARK PLUG GAP FOR FIVE MINUTES COMPARISON OF THE FORMULAS FOR THOSE BLENDS EXHIBITING AT LEAST 80% SOIL REMOVAL (AV.)

| | Formula Number: | | | | | | | | | | | | |
|---|---|---|---|---|---|---|---|---|---|---|---|---|---|
| | 79 | 88 | 92D | 94 | 128 | 198 | 199 | 201 | 207 | 214 | 215 | 217 | 221 |
| N-Methyl-2-pyrrolidone | 35 | 5 | 5 | 5 | 10 | — | — | 10 | 10 | 10 | 10 | 10 | 10 |
| 2-Pyrrolidone 1-Hydrate | — | — | — | — | — | — | 15 | — | — | — | — | — | 25 |
| Tetrahydrofuran | — | — | — | — | — | — | — | — | — | — | — | — | — |
| 4-Butyrolactone | — | — | — | — | — | 50 | 35 | 40 | 26 | 24 | 24 | 25 | — |
| Toluene | — | — | — | — | 15 | — | — | — | — | — | — | — | — |
| Mixed Xylene Isomers | — | — | — | — | — | 30 | 25 | 30 | 30 | 30 | 30 | 30 | 29 |
| Aromatic 150 Solvent | — | — | — | — | — | — | — | — | — | — | — | — | 10 |
| iso-Propylamine | — | — | — | — | — | — | — | — | — | — | — | — | — |
| n.Butylamine | 15 | — | — | — | — | — | — | — | — | — | — | — | — |
| Triethylamine | — | 10 | 10 | 10 | 15 | 9 | 9 | 9 | 14 | 12 | 10 | 14 | 20 |
| Iso-($C_7$)-paraffinics | 49 | 70½ | 63 | 60 | 20 | — | — | — | — | — | — | — | — |
| 2-Nitropropane | — | — | — | — | 20 | — | — | — | — | — | — | — | — |
| Water | 1 | — | — | — | — | — | — | — | — | — | — | — | — |
| Ammonium Hydroxide (29%) | — | ½ | 3 | 3 | 4 | 1 | 1 | 1 | 1 | 2 | 3 | 2 | 2 |
| Isopropanol (Anhydrous) | — | 10 | 15 | 18 | 12 | — | — | — | 4 | 7 | 8 | 4 | 4 |
| Lubrizol 8166 | — | 4 | 4 | 4 | 4 | — | — | — | — | — | — | — | — |
| Methyl tert.Butyl Ether | — | — | — | — | — | 10 | 15 | 10 | 15 | 15 | 15 | 15 | — |
| Soil Removal (0 to 10) | 8.0 | VGd | 8.0 | 8.5 | 8.0 | 8.0 | 8.0 | 8.3 | 8.3 | 8.3 | 8.0 | 8.1 | 8.3 |
| pH Value (25° C.) | | | | | 10.8 | | | | 11.0 | | | 11.3 | |
| Heterocyclics/Amine | 2.3 | 0.5 | 0.5 | 0.5 | 0.7 | 5.6 | 5.6 | 5.6 | 2.6 | 2.8 | 3.4 | 2.5 | 1.8 |
| Swell of EPDM (1+ days) | | | | | | | | 15% | 13% | | 15% | 15% | 16% |
| Swell of Buna (1+ days) | | | | | | | | 27% | 22% | | 22% | 24% | 21% |
| Overall Preferences: (Academic only.) | | | | | | | | | BEST! | | | | NEXT BEST |

SUMMARY SHEET
GASKET SWELL AND STABILITY AFTER EXPOSURE TO FORMULAS FOR AT LEAST ONE DAY

| | EPDM (70 Durometer) % Swell | Buna N (70 Durometer) % Swell | Fluorosilicone Max. Exposure |
|---|---|---|---|
| Formula Number | | | |
| 183 | | | 60 min. |
| 186 | | | 30 |
| 187 | | | 10 |
| 193 | 14 | 37 | 1500 |
| 194 | | | 180 ? |

-continued

SUMMARY SHEET
GASKET SWELL AND STABILITY AFTER EXPOSURE
TO FORMULAS FOR AT LEAST ONE DAY

| | EPDM (70 Durometer) % Swell | Buna N (70 Durometer) % Swell | Fluorosilicone Max. Exposure |
|---|---|---|---|
| 195 | | | 300 ? |
| 201 | 15 | 27 | 300 |
| 204 | 25 | 9 | |
| 205 | 15 | 23 | |
| 207 | 13 | 22 | |
| 208 | 14 | 24 | |
| 209 | 16 | 24 | |
| 210 | 18 | 19 | |
| 211 | 22 | 18 | |
| 213 | 13 | 22 | |
| 215 | 15 | 22 | |
| 217 | 14 | 24 | |
| 218 | 12 | 19 | |
| 220 | 15 | 24 | |
| 221 | 16 | 20 | |
| 222 | 16 | 20 | |
| N-Methyl-2-pyrrolidone | −1 | 27 | Dissolves in 40 min. |
| 2-Pyrrolidone 1-Hydrate | 0 | 7 | |
| 4-Butyrolactone | 0 | 21 | |
| Mixed Xylene Isomers | 31 | 12 | |
| Methyl tert.Butyl Ether | 25 | 5 | |
| Triethylamine | 30 | 0 | 5000+ |
| Isopropanol (Anhydrous) | 16 | 16 | |
| Aromatic 150 Solvent | 19 | 21 | |
| CHAMPION Engine Injector Fluid | 27 | 16 | 1500+ |
| n.Butylamine | | | Dissolves in 2 min. |
| iso.Propylamine | | | Dissolves in 2 min. |
| Diethylamine | | | Dissolves in 12 min |
| Dibutylamine | | | Softens in 600 min. |
| Diethylenetriamine | | | Softens in 600 min. |
| Triethylamine + Ammonia Gas | | | 5000+ |
| Toluene | | | Softens in 3000 min. |

Based upon theory, plus the data up to Formula No. 222, the following is suggested:

| | |
|---|---|
| N-Methyl-2-pyrrolidone | 49% |
| Triethylamine | 21% |
| Toluene | 20% |
| Ammonium Hydroxide (29%) | 1% min. |
| Lubrizol 8188 | 2% |
| Methyl tert.Butyl Ether | 2% |
| Isopropanol (Anhydrous) | 5% |

Adjust Ammonium Hydroxide (29%) to faint turbidity for best cleaning.

Cleaning should be by undercutting and "precipitating" dirt.

If engine has trouble idling or running to 2000 rpm, dilute with more toluene until o.k.

Dirt removal predicted to average about 9.0 (Scale of 0-10)

Add about 385 g of concentrate to 211×604 can and pressurize to 110 psi-g with about 2.7 g of nitrogen. (Fill volume is about 55 v %.) Toyota and Bosch are smaller sizes.

Toluene is preferred over Isopar C because it has a higher flashpoint, runs engines better, and has significant synergism with certain amines.

Triethylamine and isopropanol dissolve water in all proportions, and will thus solubilize ammonium hydroxide in the formula.

N-Methyl-2-pyrrolidone produces the strongest synergism of any heterocyclic or aromatic tested.

The simplified formula:

| | |
|---|---|
| N-Methyl-2-pyrrolidone | 49% |
| Triethylamine | 21% |
| Toluene | 29% |
| Ammonium Hydroxide (29%) | 1% |

COMPARISON OF AMINE STRUCTURE WITH CLEANING ABILITY
AS MEASURED BY PERCENT REMOVAL OF HEAVY CRUSTS OF
BURNED-ON OIL SLUDGE AROUND AUTOMOTIVE SPARK PLUGS

| CHEMICAL NAME | SKELETAL STRUCTURE | SLUDGE REMOVAL (%) |
|---|---|---|
| iso-Propylamine | C\C-NH$_2$ /C | 50 |
| n.Butylamine | C—C—C—C—NH$_2$ | 60 |
| Diethylamine | C—C—NH—C—C | 35 |
| Dibutylamine | C—C—C—C—NH—C—C—C—C | 3 |
| Triethylamine | C—C—N—C—C with C—C branch | 3 |
| Diethylene Triamine | H$_2$N—C—C—NH—C—C—NH$_2$ | 10 |
| Hydrazine | H$_2$N—NH$_2$ | 80 |
| N-Methyl-2-pyrrolidone | (ring) C—C—C—C—N(CH$_3$)—C=O | 15 |

CONCLUSIONS:
a. The shortest chain primary amines appear to give maximum sludge removal.
b. Straight-chain primary amines appear to be more effective than branched chain primary amines of about equal chain length.
c. Tertiary amines have low to negligable activity, but may be greatly activated by blending with short chain primary amines.
d. Hydrazine showed the greatest activity but is too dangerous to use. n.Propylamine (B.P. = 118° F. & Flashpoint = −34° F. by TCC) may be the most active of the aliphatic amines for this application.

ANALYSIS OF FIGURES

| GRAPH NO. | BINARY BLEND | MAXIMUM CLEANING ACTIVITY (%) | AMINE CONCENTRATION AT POINT OF MAXIMUM ACTIVITY (%) | AMINE CONCENTRATION AT POINT OF MAXIMUM SYNERGISM (%) | CLEANING ACTIVITY AT MAXIMUM SYNERGISM (%) | MAXIMUM SYNERGISTIC FACTOR* |
|---|---|---|---|---|---|---|
| 1. | N-Methyl-2-pyrrolidone + n.Butylamine | 97 | 30 | 10 | 90 | 4.5 |
| 2. | Tetrahydrofuran + n.Butylamine | 71 | 30 | 10 | 70 | 5.2 |
| 3. | N-Methyl-2-pyrrolidone + | 81 | 30 | 8 | 78 | 6.0 |
| 4. | 4-Butyrolactone + n.Butylamine | 71 | 38 | 15 | 62 | 6.8 |
| 5. | N-Methyl-2-pyrrolidone + iso.Propylamine | 85 | 20 | 10 | 80 | 4.2 |
| 6. | Toluene + n.Butylamine | 89 | 55 | 35 | 76 | 3.5 |
| 7. | Ethylene Glycol n.Butyl Ether + n.Butylamine | 61 | 75–100 | na.** | na. | na. |
| 8. | Lubrizol #8163 Mixture + n.Butylamine | 75 | 75 | 22 | 49 | 2.5 |
| 9. | Methyl tertiary-Butyl Ether + n.Butylamine | 60 | 100 | na. | na. | na. |
| 10. | Iso-(C$_7$)-paraffinics (Isopar E) + n.Butylamine | 60 | 100 | na. | na. | na. |

*Actual % cleaning divided by theoretical % cleaning; with concentration selected for maximum value.
**Not applicable. (No or negligable synergism.)

EXPERIMENTAL STUDY TO VALIDATE THE RELATIONSHIP OF RESULTS BETWEEN THE COLD SPARK PLUG CLEANING TEST AND TWO HOT ENGINE TESTS: (1) REDUCTION OF DYNAMIC FIRING VOLTAGE, AND (2) ENGINE CLEANING, WITH REDUCTION OF TAILPIPE EMISSIONS

EXPERIMENTAL DESIGN

A well regarded Injection Engine Cleaner formula was prepared and tested by the Cold Spark Plug Cleaning Test, using three common types of sludge that are known to accumulate on and near terminal surfaces of engine spark plugs Equivalent spark plugs were then installed in gasoline engines and exposed to the formulation for the same time period. Differentials in engine performance were noted, since these have intense commercial significance in terms of improving engine mileage, reducing ground-level ozone, reducing smog and so forth. Performance changes were noted in terms of reduction of dynamic firing voltage (kV) and reduction of tailpipe emissions of unburned hydrocarbon vapors and carbon monoxide. Variations on oxygen and carbon dioxide were also noted, as they relate to combustion efficiency.

SUMMARY OF RESULTS

The product cleaned spark plugs very effectively in the Cold Spark Plug Test. The application of the product to gasoline engines resulted in profound improvements in emissions control, plus smoother, slightly faster idling. A benevolant reduction on dynamic firing voltage (kV) was obtained.

EXPERIMENTAL

The following formulation was prepared and tested as indicated above:

| INGREDIENTS | PERCENT (w/w) |
|---|---|
| N-Methyl-2-pyrrolidone | 20.0 |
| n.Butylamine | 5.0 |
| Lubrizol 8166 Mixture | 4.0 |
| iso-($C_7$)-Paraffinic Mixture | 58.8 |
| Isopropanol - Anhydrous | 10.8 |
| De-ionized Water | 1.4 | pH Value = 13.0 at 25° C.

Results were obtained on the removal of three spark plug sludges as follows:

| a. Five minute immersion. | Heavy, oily sludge (70° F.) | |
|---|---|---|
| b. Five minute immersion. | Light, oily sludge (70° F.) | 90 & 95% removals. |
| c. Five minute immersion. | Black, carbonized sludge (70° F.) | 60% removal. |

The Dynamic Firing Voltage (kV) and Vehicle Emissions (Tailpipe without Catalytic Converter) tests were then run, using this formula on two Nissan automobiles. Note: The concentrate was pressurized with nitrogen gas and packaged in the standard aerosol dispenser prior to these tests.

CAR NUMBER ONE

Description: Nissan 80 Max with V6 Engine. Mileage was 45,065 miles. Spark plugs had been in service for many thousand of miles.

Procedure:
1. Remove spark plug from cylinder #6.
2. Replace with one contaminated with light, oily sludge - after having first blown away any loose particles with an air knife.
3. Conduct test.
   a. Run engine for two minutes on gasoline, at about 2,000 rpm.
   b. Snap accelerate to 5,000 rpm for a few seconds. Repeat twice. (This purges any loose carbon out of combustion chambers.)
   c. Conduct control tests
      i. Measure dynamic firing kV on all cylinders, plus tailpipe emissions with engine at idling rpm.
      ii. Set at "low cruise" (1500 rpm) and again measure kV and tailpipe emissions values.
      iii. Set at "high cruise" (2500 rpm) and again measure kV and tailpipe emissions values.
      Note: Accuracy of tailpipe measurements is about ±2.5 ppm of contaminants and other gases.
   d. Conduct product tests
      i. Connect Engine Injector aerosol can assembly to engine.
      ii. With motor running at about 2400-2500 rpm, add total contents in a period of about five minutes. (Typically, 260 g of product during 5.17 min.)
      iii. Repeat steps a. and b.
      iv. Repeat measurements as in step c.
   e. Remove spark plug from cylinder #6 and determine sludge removal.

Car Number Two

Description: Nissan 300ZX with V6 Engine. Mileage was 45,668 miles. Spark plugs had been in service for many thousands of miles.

Procedure: As above, Note: Injection time was 5.17 minutes, as above.

Car Number Three

Description: Nissan 300ZX with V6 Engine. Mileage was 24,887 miles. Spark plugs had been in service for many thousands of miles.

Procedure: As above. Note: Injection time wa 5.50 minutes.

| TEST RESULTS AND PRELIMINARY ANAYLSES FOR CAR NO. 1 ||||||||
|---|---|---|---|---|---|---|---|
| DYNAMIC FIRING VOLTAGES (kV) ||||||||
| CYLINDER | BEFORE TREATMENT (kV AT 724 RPM) ||| AFTER TREATMENT (kV AT 972 RPM) ||| REDUCTION ||
| NUMBER | LOWEST | AVERAGE | HIGHEST | LOWEST | AVERAGE | HIGHEST | (kV) | (% kV) |
| 1 | 5.2 | 9.4 | 10.8 | 6.3 | 8.0 | 9.1 | 1.4 | 15 |
| 2 | 5.4 | 8.4 | 9.6 | 3.9 | 7.8 | 8.6 | 0.6 | 7 |
| 3 | 6.4 | 7.9 | 10.5 | 5.1 | 8.1 | 9.2 | (0.2) | (3) |
| 4 | 6.5 | 8.7 | 10.0 | 3.9 | 6.6 | 7.1 | 2.1 | 24 |
| 5 | 3.6 | 5.1 | 6.0 | 5.3 | 7.2 | 8.0 | (2.1) | (41) |
| 6 | 5.7 | 11.5 | 12.9 | 4.4 | 7.3 | 8.5 | 3.7 | 32 |
| Average: | 5.47 | 8.50 | 9.97 | 4.82 | 7.50 | 8.42 | 1.00 | 12 |

| RAW TAILPIPE EMISSIONS (ppm) ||||||||
|---|---|---|---|---|---|---|---|
| GAS OR CONTAMINANT | BEFORE TREATMENT WITH PRODUCT ||| AFTER TREATMENT WITH PRODUCT ||| AVERAGE, BEFORE TREATMENT | AVERAGE, AFTER TREATMENT | PERCENT REDUCTION |
| (ENGINE R.P.M.) | 755 | 1490 | 2536 | 903 | 1586 | 2103 | — | — | — |
| HYDROCARBONS | 9 | 16 | 26 | 2 | 0 | 1 | 17.0 | 1.5 | 91 |
| CARBON MONOXIDE | 0.01 | 0.02 | 0.08 | 0.01 | 0.01 | 0.02 | 0.037 | 0.013 | 65 |
| OXYGEN | 0.42 | 0.19 | 0.43 | 0.38 | 0.24 | 0.31 | 0.34 | 0.31 | — |
| CARBON DIOXIDE | 15.9 | 12.0 | 15.9 | 16.0 | 16.0 | 16.0 | 14.6 | 16.0 | — |

MAJOR CONCLUSIONS

-continued

TEST RESULTS AND PRELIMINARY ANAYLSES FOR CAR NO. 1

1. Dynamic firing voltage (to overcome sludge resistance), decreases by 1.0 kV (12%) average.
2. Car idles faster and easier.
3. Hydrocarbon (unburned gasoline) contaminants are reduced by 15.5 ppm (91%) average.
4. Carbon monoxide (from incomplete combustion) contaminant is reduced by 0.024 ppm (65%) average.
5. Unreacted oxygen decreases slightly, indicating more complete combustion.
6. Carbon dioxide increases, indicating more complete combustion.

TEST RESULTS AND PRELIMINARY ANAYLSES FOR CAR NO. 2

| CYLINDER NUMBER | DYNAMIC FIRING VOLTAGES (kV) | | | | | | REDUCTION | |
|---|---|---|---|---|---|---|---|---|
| | BEFORE TREATMENT (kV AT 600 RPM) | | | AFTER TREATMENT (kV AT 616 RPM) | | | | |
| | LOWEST | AVERAGE | HIGHEST | LOWEST | AVERAGE | HIGHEST | kV | % kV |
| 1 | 6.1 | 9.7 | 11.2 | 6.7 | 8.8 | 9.7 | 0.9 | 9 |
| 2 | 6.3 | 11.5 | 12.4 | 5.0 | 9.9 | 11.3 | 1.6 | 14 |
| 3 | 5.8 | 9.8 | 10.5 | 5.9 | 8.4 | 8.9 | 1.4 | 14 |
| 4 | 6.9 | 10.9 | 12.1 | 5.9 | 9.7 | 10.7 | 1.4 | 13 |
| 5 | 7.0 | 9.3 | 9.9 | 6.4 | 8.5 | 9.4 | 0.8 | 9 |
| 6 | 6.7 | 9.8 | 12.7 | 6.1 | 9.0 | 10.2 | 0.6 | 6 |
| Average: | 6.47 | 10.17 | 11.47 | 6.00 | 9.05 | 10.03 | 1.07 | 10.5 |

| GAS OR CONTAMINANT | RAW TAILPIPE EMISSIONS (ppm) | | | | | | AVERAGE BEFORE TREATMENT | AVERAGE AFTER TREATMENT | PERCENT REDUC- TION |
|---|---|---|---|---|---|---|---|---|---|
| | BEFORE TREATMENT WITH PRODUCT | | | AFTER TREATMENT WITH PRODUCT | | | | | |
| (ENGINE R.P.M.) | 639 | 1537 | 2566 | 638 | 1485 | 2586 | — | — | — |
| HYDROCARBONS | 52 | 132 | 69 | 8 | 83 | 30 | 84.0 | 40.3 | 52 |
| CARBON MONOXIDE | 0.04 | 0.78 | 1.17 | 0.01 | 0.20 | 0.24 | 0.63 | 0.27 | 57 |
| OXYGEN | 1.16 | 0.71 | 0.73 | 0.56 | 0.20 | 0.24 | 0.87 | 0.33 | — |
| CARBON DIOXIDE | 15.3 | 14.9 | 14.7 | 15.3 | 15.4 | 15.5 | 15.0 | 15.4 | — |

MAJOR CONCLUSIONS

1. Dynamic firing voltage (to overcome sludge resistance), decreases by 1.07 kV (10.5%) average.
2. Car idles faster and easier.
3. Hydrocarbons (from unburned gasoline) contaminants are reduced by 43.7 ppm (52%) average.
4. Carbon monoxide (from incomplete combustion) contaminant is reduced by 0.36 ppm (57%) average.
5. Unreacted oxygen decreases significantly, indicating more complete combustion.
6. Carbon dioxide increases slightly, indicating more complete combustion.

TEST RESULTS AND PRELIMINARY ANAYLSES FOR CAR NO. 3

| CYLINDER NUMBER | DYNAMIC FIRING VOLTAGES (kV) | | | | | | REDUCTION | |
|---|---|---|---|---|---|---|---|---|
| | BEFORE TREATMENT (kV AT 676 RPM) | | | AFTER TREATMENT (kV AT 617 RPM) | | | | |
| | LOWEST | AVERAGE | HIGHEST | LOWEST | AVERAGE | HIGHEST | kV | % kV |
| 1 | 5.8 | 9.8 | 11.4 | 7.4 | 11.4 | 12.5 | (1.6) | (16) |
| 2 | 9.5 | 10.7 | 11.6 | 8.4 | 11.4 | 13.7 | (0.7) | (7) |
| 3 | 8.5 | 11.5 | 12.7 | 7.4 | 11.2 | 12.7 | 0.3 | 3 |
| 4 | 6.4 | 9.9 | 11.2 | 7.3 | 11.4 | 12.0 | (1.5) | (15) |
| 5 | (Spark plug lead was defective.) | | | (Spark plug lead was defective.) | | | | |
| 6 | 8.4 | 12.8 | 13.9 | 8.6 | 12.3 | 13.5 | 0.5 | 4 |
| Average: | 7.72 | 10.94 | 12.16 | 7.82 | 11.54 | 12.88 | (0.60) | (6.2) |

| GAS OR CONTAMINANT | RAW TAILPIPE EMISSIONS (ppm) | | | | | | AVERAGE, BEFORE TREATMENT | AVERAGE AFTER TREATMENT | PERCENT REDUC- TION |
|---|---|---|---|---|---|---|---|---|---|
| | BEFORE TREATMENT WITH PRODUCT | | | AFTER TREATMENT WITH PRODUCT | | | | | |
| (ENGINE R.P.M.) | 668 | 1516 | 2572 | 641 | 1473 | 2420 | — | — | — |
| HYDROCARBONS | 193 | 86 | 65 | 18 | 8 | 3 | 114.7 | 9.7 | 91.5 |
| CARBON MONOXIDE | 0.30 | 0.42 | 0.58 | 0.01 | 0.04 | 0.07 | 0.43 | 0.04 | 90.3 |
| OXYGEN | 0.86 | 0.81 | 0.94 | 0.42 | 0.34 | 0.41 | 0.87 | 0.39 | — |
| CARBON DIOXIDE | 15.1 | 15.1 | 14.8 | 15.8 | 15.9 | 15.9 | 15.0 | 15.9 | — |

MAJOR CONCLUSIONS

1. Dynamic firing voltage (to overcome sludge resistance, etc.), increased by 0.75 kV (5.9%) average.
2. Car idles faster and easier.
3. Hydrocarbons (from unburned gasoline - a contaminant are reduced by 105 ppm (91.5%) average.
4. Carbon monoxide (from incomplete combustion) contaminant is reduced by 0.39 ppm (90.3%) average.
5. Unreacted oxygen decreases significantly, indicating more complete combustion.
6. Carbon dioxide increases slightly, indicating more complete combustion.

ANALYSIS

For more optimal data analysis the results of the formula (Reference No. 82) of this report are added to those previously obtained with the highly similar one (Reference No. 69), as reported. These formulas are compared as follows:

| INGREDIENTS | Formula No. 69 | Formula No. 82 |
|---|---|---|
| N-Methyl-2-pyrrolidone | 20.5% | 20.0% |
| n-Butylamine | 5.0% | 5.0% |
| Water | 0.3% | 1.4% |
| Lubrizol 8166 Mixture | 4.0% | 4.0% |
| iso-($C_7$)-Paraffinics | 61.2% | 58.8% |
| Methyl tertiary-Butyl Ether | 9.0% | — |
| Isopropanol - Anhydrous | — | 10.8% |
| Nitrogen Gas* | q.s. | q.s. |
| ph Value (25° C.): | 12.6 | 13.0 |

*To produce the self-pressurized form, add to desired pressure. A fraction of 1% is all that is required.

Conductivity measurements indicate that both formulas may contain an additional 0.5 to 1.0% water, as moisture present in the N-Methyl-2-pyrrolidone and n-Butylamine ingredients.

The principal difference is that No. 82 contains 10.8% isopropanol (replacing the Methyl tertiary-Butyl Ether and some iso-($C_7$)-Paraffinic material), and used as a co-solvent in order to increase the solubility of water in the concentrate. As a result, the water content has been able to be increased Water increases potency.

The Cold Spark Plug Immersion Test involves placing dirty spark plugs in the concentrate for five minutes and judging the per cent soil removal. Three soils have been evaluated. Each has different solvent resistances. The results for these two formulas are as follows:

| Formula No. | Heavy Sludge | Light Sludge | Carbonized Sludge |
|---|---|---|---|
| 69 | 40% & 60% | 90% | 50% |
| 82 | — | 90% & 95% | 60% |

The results suggest that Formula No. 82 is somewhat more effective. Previous data indicate that the Cold Spark Plug Immersion Test results are good predictors for product performance in gasoline engines.

Dynamic Firing Voltage (kV) tests were run on Formula No. 82 only. Tailpipe Emissions Tests were performed on both formulas. The results are summarized in the following tabulation:

Unburned hydrocarbons decrease by 52 to 92%—average of 79%.

Unburned hydrocarbons decrease to 1.5–40.3 ppm—average of 17.1 ppm.

Carbon Monoxide emissions decrease by 57 to 90%—average of 71%.

Carbon Monoxide emissions decrease to 0.01–0.27 ppm—average of 0.11 ppm.

Oxygen emission levels are close to 0.35 ppm. (Levels below 0.50 ppm indicate good computer adjustments and good combustion.)

Carbon Dioxide levels are above 15.4 ppm., indicating good combustion.

Unreacted oxygen is decreased slightly, while carbon dioxide is increased slightly, indicating move complete combustion.

The dramatic decreases in unburned hydrocarbons and carbon monoxide indicate more complete combustion.

The engine idles faster and more smoothly after treatment.

The formula exhibits a diversity of cleaning and emissions reduction effects when used on different cars. For example, Formula No. 82 on Car No. 1, reduced unburned hydrocarbons to 1 ppm, and carbon monoxide to 0.01 ppm. This is less than one percent of the amount of these chemicals that are emitted by many automobiles.

The tailpipe emission levels were sampled upstream from the catalytic converter unit. The ability of the converter to reduce emissions is a function of the amount of emitted materials and the age (in miles) of the device. Many cars have converters that are impaired or dysfunctional because of long and heavy service. A program of engine cleaning, using Formula No. 82 or a like product, should dramatically lengthen the service life of a catalytic converter.

Aside from the beneficial effects on the engine, such as better mileage, quieter operation, improved performance and greater converter longevity, the engine cleaner should be of interest to the EPA (Automotive Emissions Control Divison; Ann Arbor, Mich.) and to countries (as Mexico) where cars are not equipped with

SUMMARY SHEET

| AVERAGE REDUCTION OF FIRING VOLTAGE (kV) USING FORMULA NO. 82 | | | |
|---|---|---|---|
| Attribute | Car Number 1 | Car Number 2 | Car Number 3 |
| Average reduction (kV) | 1.00 | 1.07 | (0.75) |
| Average reduction (%) | 12 | 10.5 | (5.9) |

| FINAL CONCENTRATION AND PERCENT REDUCTION OF EMISSIONS | | | | | | |
|---|---|---|---|---|---|---|
| GAS OR | FORMULA NO. 69 | | FORMULA NO. 82 | | | AVERAGE |
| CONTAMINANT | Car Number 1 | Car Number 2 | Car Number 1 | Car Number 2 | Car Number 3 | (All cars) |
| Unburned Hydro- | 9.7 ppm | 45.0 ppm | 1.5 ppm | 40.3 ppm | 9.7 ppm | 21.4 ppm |
| carbons (HC) | 81.4% | 81.3% | 91.0% | 52.0% | 91.5% | 79.5% |
| Carbon Monoxide | 0.02 ppm | 0.12 ppm | 0.01 ppm | 0.27 ppm | 0.04 ppm | 0.09 ppm |
| (CO) | 88.2% | 85.7% | 65.0% | 57.0% | 90.3% | 77.3% |
| Oxygen | 0.45 ppm | 0.21 ppm | 0.31 ppm | 0.33 ppm | 0.39 ppm | 0.34 ppm |
| ($O_2$) | — | — | — | — | — | — |
| Carbon Dioxide | 15.7 ppm | 16. ppm | 16. ppm | 15.4 ppm | 15.9 ppm | c.a. 16. ppm |
| ($CO_2$) | — | — | — | — | — | — |

Based on Cold Spark Plug Immersion Tests, Formula No. 82 is considered to be about 10–20% more powerful as a cleaner than Formula No. 69. The limited Hot Engine Emmissions Test data do not permit formula discrimination.

CONCLUSIONS

The results of treating three Nissan cars with Formula No. 82 are summarized as:

Spark plug firing voltage (kVv) changes by +6 to −12%.

catalytic converters, inasmuch as it provides a means of decreasing such air contaminants as ozone and carbon monoxide. Programs for reductions of these substances are mandated in the U.S. Clean Air Act.

EXPERIMENTAL STUDY TO VALIDATE THE RELATIONSHIP OF RESULTS BETWEEN THE COLD SPARK PLUG CLEANING TEST AND THE HOT SPARK PLUG ENGINE-AND-SPARK-PLUG CLEANING TEST - WITH REDUCTION OF TAILPIPE EMISSIONS

EXPERIMENTAL DESIGN

A highly regarded formulation was prepared and tested by the Cold Spark Plug Cleaning Test against three common types of sludge that coat the terminal surfaces of spark plugs. Equivalent spark plugs were then installed in a gasoline engine and exposed to the formulation for the same time period. Differentials in engine emission levels were noted, since these have intense commercial significance. The spark plugs were then removed and compared to standards to determine the degree of cleaning in what is termed the Hot Spark Plug Cleaning Test. The results of the two tests were then compared.

SUMMARY OF RESULTS

The cleaning results of the Cold and the Hot tests compared very closely. The application of the product to the gasoline engine resulted in a profound improvement in emissions control, plus smoother, slightly faster idling. The comparison suggests that performance in the Cold test can be used to predict performance in the Hot test.

EXPERIMENTAL

The following formulation was prepared and tested in both Cold and Hot tests:

| Ingredients | Percent |
| --- | --- |
| N-Methyl-2-pyrrolidone | 20.5 (±0.5) |
| n-Butylamine | 5.0 |
| Lubrizol 8166 Mixture | 4.0 |
| iso-($C_7$)-Paraffinics | 61.2 (±0.5) |
| Methyl tertiary-Butyl Ether | 9.0 |
| Water | 0.3 |

Results on three types of spark plug sludge were as follows:

| | |
| --- | --- |
| a. Five minute immersion; heavy, oily sludge (70° F.) | 50% removal. |
| b. Five minute immersion; light, oily sludge (70° F.) | 90% removal. |
| c. Five minute immersion; black carbonized sludge (70° F.) | 50% removal. |

The Hot cleaning test was run on two Nissan cars with approximately the same engine characteristics. Only the light, oily sludge and black, carbonized sludge were tested. The testing routine was exactly the same for each car.

Car Number One

Description: Nissan Sport Car, with V-6 Engine having 3,000 ml total volume of cylinders. Mileage was 45,735. Not an "oil burning" engine. Spark plugs had been in use for many thousands of miles.

Test Procedure:
Remove spark plugs from cylinders #1 and #3.
2. Select a spark plug contaminated with light, oily sludge. Wipe housing around fire tip. Blow away any loose particles using an "air knife". Put plug into cylinder #1.
3. Select a spark plug contaminated with black, carbonized sludge. Wipe housing around fire tip. Blow away any loose particles using an "air knife". Put plug into cylinder #3.
4. Conduct test.
  a. Run engine for two minutes on gasoline at 2,000 rpm.
  b. Snap accelerate to 5,000 rpm for a few seconds. Repeat twice. (This purges any loose carbon out of the combustion chamber.)
  c. Conduct control test.
     i. Measure idling rpm and tailpipe emissions. (Hydrocarbons, carbon monoxide and oxygen levels.)
     ii. Set at "low cruise" (1500 rpm) and measusre tailpipe emissions, as above.
     iii. Set at "high cruise" (2500 rpm) and measure tailpipe emissions, as above.
     Note: Accuracy of measurements is about ±2.5 ppm. of tailpipe contaminants.
  d. Connect Engine Injector aerosol can and assembly to engine. With motor running at 2000 rpm, add 260 g of product over a period of five minutes.
     Note: Odor of emissions during cleaning is a very intense organic amine type. Do not breathe.
  e. Repeat step a.
  f. Repeat step b.
  g. Repeat measurements as in step c.
  h. Remove spark plugs from cylinders #1 and #3 and inspect for percent sludge removal.
  i. Compare removal to results of Cold Spark Plug Cleaning Test.

Car Number Two

Description: Nissan Formula ZX, with V-6 engine having 3,000 ml. total of cylinders. Mileage was 44,285. Note: Engine was burning oil to a slight extent, as evidenced by a whitish residue in the tailpipe and other indications.

Test Procedure: As above, for Car Number One.

The results of the two Hot Spark Plug Cleaning Tests (including emissions assay) are presented as follows:

| | PRODUCT PERFORMANCE IN HOT SPARK PLUG CLEANING TESTS | | | | | |
| --- | --- | --- | --- | --- | --- | --- |
| | EMISIONS ASSAY AND CLEANING RESULTS | | | | | |
| | NISSAN CAR NO. 1 | | | NISSAN CAR NO. 2 | | |
| MEASURE-MENTS | Idle | Low Cruise | High Cruise | Idle | Low Cruise | High Cruise |
| BEFORE TREATMENT | | | | | | |
| Engine Speed (rpm) | 690 | 1500 | 2500 | 626 | 1500 | 2500 |
| Hydrocarbons (ppm) | 57 | 67 | 50 | 407 | 213 | 103 |
| Carbon Monox. (ppm) | 0.01 | 0.13 | 0.36 | 0.79 | 0.85 | 0.88 |
| Oxygen (ppm) | 0.61 | 0.37 | 0.75 | 1.38 | 1.08 | 0.81 |
| Carbon Diox. (ppm) | 15.7 | 15.8 | 15.2 | 13.6 | 16 | 14.4 |
| AFTER TREATMENT | | | | | | |
| Engine Speed (rpm) | 724 | 1500 | 2500 | 655 | 1500 | 2500 |
| Hydrocarbons (ppm) | 14 | 10 | 5 | 50 | 57 | 28 |
| Carbon Monox. (ppm) | 0.01 | 0.03 | 0.02 | 0.02 | 0.08 | 0.26 |
| Oxygen (ppm) | 0.58 | 0.28 | 0.48 | 0.19 | 0.20 | 0.24 |
| Carbon Diox. | 15.5 | 15.9 | 15.8 | 16 | 16 | 16 |

PRODUCT PERFORMANCE IN HOT SPARK PLUG CLEANING TESTS -continued

| | NISSAN CAR NO. 1 | | NISSAN CAR NO. 2 | |
|---|---|---|---|---|
| MEASURE- | | Low | High | | Low | High |
| MENTS | Idle | Cruise | Cruise | Idle | Cruise | Cruise |
| (ppm) | | | | | | |
| SLUDGE REMOVAL (%) | | | | | | |
| Spark Plug #1 | | 93 | | | 93 | |
| Spark Plug #3 | | 55 | | | 55 | |

A comparison of the spark plug cleaning results between the five minute Cold test and the five minute Hot (engine) test is made as follows:

COMPARISON OF COLD AND HOT SPARK PLUG CLEANING RESULTS

| | | PERCENT SLUDGE REMOVAL** | | |
|---|---|---|---|---|
| SPARK PLUG NUMBER* | NATURE OF CONTAMINANT | COLD TEST | HOT TEST; CAR NO. 1 | HOT TEST; CAR NO. 2 |
| 1 | Light, oily sludge. | 90 | 93 | 93 |
| 3 | Black, carbonized sludge. | 50 | 55 | 55 |

*Numbers refer to Hot test only.
**Accuracy is about ±5%.

CONCLUSIONS

The engine injector formula was tested for spark plug cleaning ability for five minutes in the *Cold* Immersion test and for five minutes in the *Hot* engine test. The results are comparable, although slightly more sludge may have been removed in the *Hot* engine test.

It is noted that extending immersion time in the *Cold* immersion test do result in much additional cleaning. A five minute *Hot* engine test may, therefore, be more comparable to a ten or fifteen minute *Cold* immersion test.

The *Hot* engine test would normally be expected to yield higher sludge removal results, since virtually all solvents become more active when heated. However, in that test, most of the spark plug contact is thought to be with the solvent vapors, e.g. a diluted form of the solvent, which might slow the cleaning process. The effect of various pyrolysis products in the combustion chamber is unknown.

Based on the study, the *Cold* immersion test may be considered as roughly comparable to the *Hot* engine test in terms of measuring cleaning power. The results of the *Hot* engine test are considered to be as good, or perhaps slightly better than those obtained in the Cold immersion test. The relationship of the results of the *Cold* immersion test to engine emissions reduction appears straightforward: the greater degree of cleaning, the greater the reduction in hydrocarbon and carbon monoxide emissions; but this must be confirmed by further testing of other formulations.

It is appropriate to further examine the emissions reduction data. For both Nissan cars, the level of unburned hydrocarbons in the tailpipe appears to diminish as rpm is increased. This is true for both uncleaned and cleaned engines.

The amount of carbon monoxide (a product of incomplete combustion) might be expected to follow the same pattern as that of the unburned hydrocarbons. However, it does not. There is an apparent increase in the concentration of this gas as engine speeds are increased.

There do not seem to be any speed-related trends for oxygen and carbon dioxide emission levels. Oxygen levels of 0.50 ppm or below indicate that the computer is making good adjustments. Carbon dioxide levels of about 15 ppm or higher indicate good combustion. The computer is adjusted to provide the engine with a certain air flow volume (calibrated at sea-level conditions) to the engine when at idle speed only. At higher speeds, adjustment are made to the fuel supply.

For Nissan car Number 1, before treatment, unburned hydrocarbons average 58 ppm. After treatment they are reduced to an average value of 9.7 ppm—an 83% reduction.

For the same car, carbon monoxide emissions were reduced from an average of 0.17 ppm to an average of 0.02 ppm—an 88% reduction.

For Nissan car Number 2, unburned hydrocarbons were reduced from an average of 241 ppm to an average of 45 ppm—an 81% reduction.

Finally, for the same car, carbon monoxide emissions were reduced from an average of 0.84 ppm to an average of 0.12 ppm—an 86% reduction.

Hydrocarbons (VOCs, or "Volatile Organic Compounds") and carbon monoxide are cited by the Federal Clean Air Act as substances which must be considered as air contaminants. In the two cars tested, the engine injector formulas reduced these contaminants by an average of 84.5%.

| | Formula No. | |
|---|---|---|
| | 213A | 214A |
| 2-Pyrrolidone 1-Hydrate | 10.0 | 14.416 |
| N-Methyl-2-Pyrrolidone | 12.0 | 9.614 |
| Triethylamine | 10.0 | 14.416 |
| Isopropyl Alcohol | 15.5 | 14.600 |
| Methyl Tert-Butyl Ether | 5.8 | 5.188 |
| Xylene | 9.0 | — |
| Dow Fax 2A1 | 0.5 | 0.485 |
| Ammonia Hydroxide 28° Be' | 2.2 | 2.881 |
| Isopar "C" | 35.0 | — |
| Regular Unleaded Gasoline | — | 38.400 |

The following are bench cleaning injector fuel flow results from formulae Nos. 213A and 214A. Results are also listed for comparative studies using competitors' products.

I. Test Procedure:

An initial flow is obtained for the test injector.

The injector is attached to a device which measures fuel flow. An aerosol can containing n-Heptane at 70° F. is attached to the delivery device. The inlet pressure is set to precisely 40 psi and n-Heptane is delivered to the injector by electronically holding the injector wide-open.

N-Heptane passes through the flow meter, when the readout stabilizes, after approximately 2–3 seconds, a reading is obtained, which indicates fuel flow in cc/second.

The injector is then cleaned after switching devices and attaching an aerosol can containing an electronic fuel injector cleaning product. Using an electronic pulse tester the injector is electronically pulsed at 5 milliseconds pulse width, (injector opening period) and 100 of these pulses every 10 seconds for approximately 7-8 minutes at 30 psi.

These conditions approximate an engine operating at idle speed.

7-8 minutes of this treatment delivers up to 60 grams quantities of cleaning fluid. This amount of cleaning fluid is the approximate amount of cleaning fluid that would be delivered through the injectors of a six-cylinder engine running for the same period of time.

II. The test injector was tested for any flow improvement, according to the procedure outlined in step No. I.

Results - Formula #213A

| Long Cold Starts | Before Cleaning | After Cleaning | % Incr. |
|---|---|---|---|
| Injector #1 | 2.97 cc/sec | 4.86 cc/sec | 63.72 |
| Injector #2 | 2.43 cc/sec | 4.94 cc/sec | 103.29 |

Results - Formula #214A

| Long Cold Starts | Before Cleaning | After Cleaning | % Incr. |
|---|---|---|---|
| Injector #3 | 4.775 cc/sec | 4.985 cc/sec | 4.395 |
| Injector #4 | 0.21 cc/sec | 5.05 cc/sec | 2304.76 |
| Cold Start A- cleaned on vehicle | 1.41 cc/sec | 1.79 cc/sec | 21.5 |
| Injector #2 | 1.42 cc/sec | 1.66 cc/sec | 16.9 |
| Injector #3 | 1.47 cc/sec | 1.62 cc/sec | 10.2 |
| Injector #4 | 0.90 cc/sec | 1.51 cc/sec | 68 |
| Multi-port Injector #4 | 3.75 cc/sec | 3.81 cc/sec | 1.71 |

RESULTS - CLEANING WITH FORMULA #214A
Cold Start Injector
Fuel Flow Results:

I. Fuel flow before cleaning:
  1.66-1.68 cc/sec.
II. Fuel flow after cleaning:
  1.82 cc/sec.
III. Fuel flow after driving:
  1.82 cc/sec.
IV. Fuel flow after cleaning on car a second time for a total of 7 minutes and 50 seconds:
  1.85 cc/sec.
V. Fuel flow after an additional cleaning out of the vehicle:
  1.84 cc/sec.

% Increase
10.78

FUEL FLOW RESULTS - CLEANING WITH FORMULA #214A

Vehicle Data:
Year/Make: 1984 Nissan 300ZK
Mileage: 101,483
VIN#: JN1H216S9EX004847

Notes:
1. Three dirty injectors from a Nissan 280ZX model were installed on one of the rails from the test vehicle.
2. After obtaining an initial flow on all of the injectors, an original rail from the vehicle and the rail containing the three dirty injectors were installed in the test vehicle.
3. The injectors were cleaned on the car with Formula #214A.
4. Total cleaning time: 4 minutes
5. Both rails were removed from the car after cleaning and fuel flows were obtained.

Results

| Injector I.D. | Before Flow Cleaning | After Flow Cleaning | % Incr. |
|---|---|---|---|
| Nissan 280ZX Injectors | | | |
| New Injector | 3.20 cc/sec. | | |
| I-6 #1 | 2.60 cc/sec. | 3.15 cc/sec. | 21.15 |
| I-6 #4 | 2.97 cc/sec. | 3.17 cc/sec. | 6.73 |
| I-6 #6 | 2.78 cc/sec. | 3.15 cc/sec. | 13.31 |
| Nissan 300ZX Injectors | | | |
| New Injector | 3.30 cc/sec. | | |

RESULTS - COMPARATIVE STUDY OF FORMULA #214A & COMPETITORS' PRODUCTS

| INJECTOR # | PRODUCT TESTED | FLOW BEFORE CLEANING | INJECTOR FLOW AFTER CLEANING | % INCREASE |
|---|---|---|---|---|
| I. | CHAMPION INJECTOR CLEANER | 2.48-2.50 cc/sec | 2.50 cc/sec | 0 |
| II. | B.G. INJECTOR CLEANER | 2.48 cc/sec | 2.55 cc/sec | 2.80 |
| III. | PCP FORMULA #214A | 2.00 cc/sec | 2.78 cc/sec | 39.0 |
| I. | CLEANING W/ CHAMPION FOLLOWED BY FORMULA #214A | 2.54 cc/sec | 3.18 cc/sec | 25.20 |
| II. | CLEANING W/ B.G. FOLLOWED BY FORMULA #214A | 2.48 cc/sec | 3.03 cc/sec | 22.17 |

| | FLOW BEFORE CLEANING | AFTER CLEANING W/CHAMPION | AFTER CLEANING W #214A | % INCREASE |
|---|---|---|---|---|
| COLD START | 1.71 cc/sec | 1.71 cc/sec | 2.01 cc/sec | 17.54 |
| MULTI-PORTS: MERCEDES HIGH FLOW | 8.19 cc/sec | 8.19 cc/sec | 8.88 cc/sec | 8.42 |

| -continued |  |  |
|---|---|---|
| FUEL FLOW RESULTS - CLEANING WITH FORMULA #214A | | |
| D | 3.25 cc/sec. | 3.32 cc/sec. | 2.15 |
| E | 3.30 cc/sec. | 3.32 cc/sec. | 0.60 |
| F | 3.28 cc/sec. | 3.32 cc/sec. | 1.22 |

DISCUSSION

The advantages of the engine injector product include:
a. Better mileage.
b. Smoother engine performance. Quieter operation.
c. Lowered contaminant burden on the catalytic converter system.
  i. Longer service life.
  ii. Reduced average back-pressure.
d. Less introduction of hydrocarbon and carbon monoxide contaminants into the ground-level (tropospheric) air mass.
  i. Less smog.
  ii. Less animal and plant toxicity; e.g. human nasal & eye irritations.
e. Reduced automotive repair shop expenditures for engine-related problems.

The Federal Clean Air Act of 1974 (as later amended) calls for a national standard of not more than 0.12 ppm ozone and 9.0 ppm carbon monoxide, plus certain airborne particulate controls. At the end of 1987 about 70 urban areas were in non-compliance, having 0.13 to 0.30 ppm of ozone, and 10 to 25 ppm of carbon monoxide.

Ozone is produced by sunlight on nitrogen (IV) oxide and oxygen:

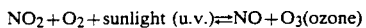

$$NO_2 + O_2 + \text{sunlight (u.v.)} \rightleftharpoons NO + O_3 \text{(ozone)}$$

as an equilibrium process. If NO [nitrogen (II) oxide] is removed, the reaction will produce more and more ozone. Unburned hydrocarbon gases chemically react with NO and remove it, thus allowing ozone to rise to dangerous levels.

The U.S. EPA estimates that about 90% of hydrocarbons and carbon monoxide are generated by "moving sources; e.g. cars and trucks. The other 10% comes from escaping gasoline fumes, lawn mowers, aerosols, paint products, trees and hundreds of other sources. There are a number of active attempts to reduce the hydrocarbon emissions from all these small sources, especially in the states of California, New Jersey and New York. As to cars and trucks, there is conception that "all that can be done has already been done"— which, of course is incorrect, in the light of the experimental car engine emission control data recited above. The only effective way to manage ozone and carbon monoxide inventories is to further reduce engine emissions.

The results obtained in the tailpipe studies were based on withdrawals from the tailpipe at a sampling point upstream from the catalytic converter unit. This unit is presumed to be far less effective at about 45,000 miles than it was when newly installed. However, for presentation of results that have maximum environmental significance, tailpipe samplings must also be taken at a point downstream from the catalytic converter unit. Results must also be obtained from the same vehicle(s) several thousand miles later on, to show that the cleaning process has a reasonably long-term beneficial effect on emission control. Other data suggests that the suppression of contaminant formulation is, in fact, long term, but this should be elaborated.

What is claimed is:

1. A composition of matter for dissolving varnish and burned-on sludge in an internal combustion engine which comprises (i) a five-membered heterocyclic ring compound having four carbon atoms and one nitrogen atom consecutively linked and (ii) hydrazine in a ratio in the range of 96:4 to 4:96.

2. A composition of claim 1, wherein the five-membered ring comprises a straight or branched chain attached to an atom of the ring.

3. A composition of claim 1 further comprising water.

4. A composition of claim 3, wherein the water comprises less than about 1% by weight of the composition.

5. A composition of claim 1 further comprising an engine fuel.

6. A composition of claim 1, wherein the five-membered ring and hydrazine are in synergistic amounts.

7. A composition of claim 1, wherein the five-membered ring is N-methyl-2-pyrrolidone or 2-pyrrolidone-1-hydrate.

8. A composition of claim 1, wherein the hydrazine is present as hydrazine monohydrate.

9. A composition of claim 1 further comprising an additive selected from the group consisting of lower alkyl alcohols, lubricants, and ethers.

10. A composition of claim 1 further comprising ammonia or ammonium hydrate.

11. A composition of claim 10 further comprising triethylamine.

12. A composition of claim 11, wherein the triethylamine is present in a concentration greater than about 10% by weight of the composition.

13. A method of dissolving varnish and burned-on sludge in an internal combustion engine which comprises contacting the fuel-exposed areas of the engine with the composition of claim 33 under conditions such that the varnish and burned-on sludge is dissolved.

14. A method of claim 13 which further comprises mixing the composition of claim 1 with an engine fuel prior to contacting with the fuel-exposed areas of the engine.

* * * * *

UNITED STATES PATENT AND TRADEMARK OFFICE
CERTIFICATE OF CORRECTION

PATENT NO. : 4,992,187

DATED : February 12, 1991

INVENTOR(S) : Lawrence J. Adams, Thomas R. Fruda, Paul D. Hughett

Page 1 of 2

It is certified that error appears in the above-identified patent and that said Letters Patent is hereby corrected as shown below:

Column 18, line 22, change "; page 24" to read --Section--.

Column 19, line 44, should read as follows:
--Formula Number: 061  062  063  064  065  066#  067  068  069  070  071--

Column 19, line 54, should read as follows:  --Comparing Formulas No. 066# -068, diethylamine looks better than primary amines iso. Propylamine and N.Butylamine.--

Column 19, line 56, should read as follows:  --The mediocre values of synergistic Formulas No. 066# -071 represent the diluting effects of the iso ($C_7$)-Paraffinics and Methyl.--

Column 19, line 60, should read as follows:  --There are two formulas identified as 0.66:  cited here as 066 and 066#--.

Column 21, line 49, delete -- - --.

Column 31, line 44 and line 45, should read as follows:
--Methyl tert. Butyl Ether    15   15   15   15   15   15   15   15   15
  Isopropanol (Anhydrous)    4.3   8    7    8    8    4    6    6    4--

UNITED STATES PATENT AND TRADEMARK OFFICE
CERTIFICATE OF CORRECTION

PATENT NO.  : 4,992,187
DATED       : February 12, 1991
INVENTOR(S) : Lawrence J. Adams, Thomas R. Fruda, Paul D. Hughett It is certified that error appears in the above-identified patent and that said Letters Patent is hereby corrected as shown below:

```
Column 39, line 44, should read as follows:
--3. N-Methyl-2-pyrrolidone +
     Diethylamine              81    30    8    78    6.0--

Column 46, line 15, change "move" to --more--.
```

Signed and Sealed this

First Day of June, 1993

Attest:

MICHAEL K. KIRK

Attesting Officer

Acting Commissioner of Patents and Trademarks